(12) United States Patent
Saquib et al.

(10) Patent No.: US 7,826,660 B2
(45) Date of Patent: Nov. 2, 2010

(54) DIGITAL IMAGE EXPOSURE CORRECTION

(76) Inventors: Suhail S. Saquib, 31 Trowbridge La., Shrewsbury, MA (US) 01545; Jay E. Thornton, 56 Lincoln St., Watertown, MA (US) 02472

( * ) Notice: Subject to any disclaimer, the term of this patent is extended or adjusted under 35 U.S.C. 154(b) by 291 days.

(21) Appl. No.: 11/546,633

(22) Filed: Oct. 12, 2006

(65) Prior Publication Data
US 2007/0036457 A1    Feb. 15, 2007

Related U.S. Application Data

(62) Division of application No. 10/375,440, filed on Feb. 27, 2003, now Pat. No. 7,283,666.

(51) Int. Cl.
G06K 9/00    (2006.01)
(52) U.S. Cl. ..................................... 382/167
(58) Field of Classification Search ............. None
See application file for complete search history.

(56) References Cited

U.S. PATENT DOCUMENTS

| | | | |
|---|---|---|---|
| 3,820,133 A | 6/1974 | Adorney et al. | |
| 3,864,708 A | 2/1975 | Allen | |
| 4,070,587 A | 1/1978 | Hanakata | |
| 4,072,973 A | 2/1978 | Mayo | |
| 4,089,017 A | 5/1978 | Buldini | |
| 4,154,523 A | 5/1979 | Rising et al. | 355/38 |
| 4,168,120 A | 9/1979 | Freier et al. | 355/38 |
| 4,284,876 A | 8/1981 | Ishibashi et al. | |
| 4,309,712 A | 1/1982 | Iwakura | |
| 4,347,518 A | 8/1982 | Williams et al. | |
| 4,364,063 A | 12/1982 | Anno et al. | |
| 4,385,302 A | 5/1983 | Moriguchi et al. | |
| 4,391,535 A | 7/1983 | Palmer | |

(Continued)

FOREIGN PATENT DOCUMENTS

EP    0 204 094    4/1986

(Continued)

OTHER PUBLICATIONS

"Automated Global Enhancement of Digitized Photographs", by Bhukhanwala et al., 8087 IEEE Transactions on Consumer Electronics, Feb. 1994.

(Continued)

*Primary Examiner*—Yuzhen Ge
(74) *Attorney, Agent, or Firm*—Woodcock Washburn LLP

(57) ABSTRACT

Techniques are disclosed for correcting the exposure of a digital image. An exposure predictor may be generated based on a set of images for which ground truth data are known. After identifying an optimal set of features, the exposure of the digital image may be corrected by extracting values of the selected optimal features from the image, using the predictor to predict a desired exposure correction for the image, and correcting the exposure of the image by the predicted desired amount. Exposure correction is based on a model that relates intensity of light in the world to the RGB digits of the digital image. The model comprises a gamma function that models the response of a typical monitor and a S-shaped curve that compresses the large dynamic range of the world to the small dynamic range of the RGB digit space.

27 Claims, 20 Drawing Sheets

U.S. PATENT DOCUMENTS

| | | | |
|---|---|---|---|
| 4,415,908 A | 11/1983 | Sugiura | |
| 4,443,121 A | 4/1984 | Arai | |
| 4,447,818 A | 5/1984 | Kurata et al. | |
| 4,464,669 A | 8/1984 | Sekiya et al. | |
| 4,514,738 A | 4/1985 | Nagato et al. | |
| 4,524,368 A | 6/1985 | Inui et al. | |
| 4,540,992 A | 9/1985 | Moteki et al. | |
| 4,563,691 A | 1/1986 | Noguchi et al. | |
| 4,607,262 A | 8/1986 | Moriguchi et al. | |
| 4,638,372 A | 1/1987 | Leng et al. | |
| 4,686,549 A | 8/1987 | Williams et al. | |
| 4,688,051 A | 8/1987 | Kawakami et al. | |
| 4,738,526 A | 4/1988 | Larish | |
| 4,739,344 A | 4/1988 | Sullivan et al. | |
| 4,777,496 A | 10/1988 | Maejima et al. | |
| 4,805,033 A | 2/1989 | Nishikawa | |
| 4,809,063 A | 2/1989 | Moriguchi et al. | |
| 4,884,080 A | 11/1989 | Hirahara et al. | |
| 4,907,014 A | 3/1990 | Tzeng et al. | |
| 4,933,709 A | 6/1990 | Manico et al. | 355/38 |
| 4,962,403 A | 10/1990 | Goodwin et al. | 355/38 |
| 5,006,866 A | 4/1991 | Someya | |
| 5,045,952 A | 9/1991 | Eschbach | |
| 5,046,118 A * | 9/1991 | Ajewole et al. | 382/169 |
| 5,066,961 A | 11/1991 | Yamashita | |
| 5,086,306 A | 2/1992 | Sasaki | |
| 5,086,484 A | 2/1992 | Katayama et al. | |
| 5,109,235 A | 4/1992 | Sasaki | |
| 5,115,252 A | 5/1992 | Sasaki | |
| 5,130,821 A | 7/1992 | Ng | |
| 5,132,703 A | 7/1992 | Nakayama | |
| 5,132,709 A | 7/1992 | West | |
| 5,162,813 A | 11/1992 | Kuroiwa et al. | |
| 5,184,150 A | 2/1993 | Sugimoto | |
| 5,208,684 A | 5/1993 | Itoh | |
| 5,244,861 A | 9/1993 | Campbell et al. | |
| 5,248,995 A | 9/1993 | Izumi | |
| 5,268,706 A | 12/1993 | Sakamoto | |
| 5,285,220 A | 2/1994 | Suzuki et al. | |
| 5,307,425 A | 4/1994 | Otsuka | |
| 5,323,245 A | 6/1994 | Rylander | |
| 5,333,246 A | 7/1994 | Nagasaka | |
| 5,422,662 A | 6/1995 | Fukushima et al. | |
| 5,455,685 A * | 10/1995 | Mori | 348/363 |
| 5,469,203 A | 11/1995 | Hauschild | |
| 5,479,263 A | 12/1995 | Jacobs et al. | |
| 5,497,174 A | 3/1996 | Stephany et al. | |
| 5,521,626 A | 5/1996 | Tanaka et al. | |
| 5,539,443 A | 7/1996 | Mushika et al. | |
| 5,569,347 A | 10/1996 | Obata et al. | |
| 5,576,745 A | 11/1996 | Matsubara | |
| 5,602,653 A | 2/1997 | Curry | |
| 5,617,223 A | 4/1997 | Burns et al. | |
| 5,623,297 A | 4/1997 | Austin et al. | |
| 5,623,581 A | 4/1997 | Attenberg | |
| 5,625,399 A | 4/1997 | Wiklof et al. | |
| 5,642,148 A | 6/1997 | Fukushima et al. | |
| 5,644,351 A | 7/1997 | Matsumoto et al. | |
| 5,646,672 A | 7/1997 | Fukushima | |
| 5,664,253 A | 9/1997 | Meyers | |
| 5,668,638 A | 9/1997 | Knox | |
| 5,694,484 A | 12/1997 | Cottrell et al. | |
| 5,703,644 A * | 12/1997 | Mori et al. | 348/363 |
| 5,706,044 A | 1/1998 | Fukushima | |
| 5,707,082 A | 1/1998 | Murphy | |
| 5,711,620 A | 1/1998 | Sasaki et al. | |
| 5,719,615 A | 2/1998 | Hashiguchi et al. | |
| 5,721,578 A | 2/1998 | Nakai et al. | |
| 5,724,456 A * | 3/1998 | Boyack et al. | 382/274 |
| 5,729,274 A | 3/1998 | Sato | |
| 5,757,976 A | 5/1998 | Shu | |
| 5,777,599 A | 7/1998 | Poduska, Jr. | |
| 5,781,315 A | 7/1998 | Yamaguchi | 358/520 |
| 5,784,092 A | 7/1998 | Fukuoka | |
| 5,786,837 A | 7/1998 | Kaerts et al. | |
| 5,786,900 A | 7/1998 | Sawano | |
| 5,800,075 A | 9/1998 | Katsuma et al. | |
| 5,808,653 A | 9/1998 | Matsumoto et al. | |
| 5,809,164 A | 9/1998 | Hultgren, III | 382/162 |
| 5,809,177 A | 9/1998 | Metcalfe et al. | |
| 5,818,474 A | 10/1998 | Takahashi et al. | |
| 5,818,975 A | 10/1998 | Goodwin et al. | 382/274 |
| 5,835,244 A | 11/1998 | Bestmann | |
| 5,835,627 A | 11/1998 | Higgins et al. | |
| 5,841,461 A | 11/1998 | Katsuma | |
| 5,859,711 A | 1/1999 | Barry et al. | |
| 5,880,777 A * | 3/1999 | Savoye et al. | 348/217.1 |
| 5,889,546 A | 3/1999 | Fukuoka | |
| 5,913,019 A | 6/1999 | Attenberg | |
| 5,956,067 A | 9/1999 | Isono et al. | |
| 5,956,421 A | 9/1999 | Tanaka et al. | |
| 5,970,224 A | 10/1999 | Salgado et al. | |
| 5,978,106 A | 11/1999 | Hayashi | 358/518 |
| 5,995,654 A | 11/1999 | Buhr et al. | |
| 5,999,204 A | 12/1999 | Kojima | |
| 6,005,596 A | 12/1999 | Yoshida et al. | |
| 6,028,957 A | 2/2000 | Katori et al. | |
| 6,069,982 A | 5/2000 | Reuman | |
| 6,104,421 A | 8/2000 | Iga et al. | |
| 6,104,468 A | 8/2000 | Bryniarski et al. | |
| 6,104,502 A | 8/2000 | Shiomi | |
| 6,106,173 A | 8/2000 | Suzuki et al. | |
| 6,108,105 A | 8/2000 | Takeuchi et al. | |
| 6,128,099 A | 10/2000 | Delabastita | |
| 6,128,415 A | 10/2000 | Hultgren, III et al. | 382/276 |
| 6,133,983 A | 10/2000 | Wheeler | 355/40 |
| 6,157,459 A | 12/2000 | Shiota et al. | |
| 6,172,768 B1 | 1/2001 | Yamada et al. | |
| 6,186,683 B1 | 2/2001 | Shibuki | |
| 6,204,940 B1 | 3/2001 | Lin et al. | 358/527 |
| 6,208,429 B1 | 3/2001 | Anderson | |
| 6,226,021 B1 | 5/2001 | Kobayashi et al. | |
| 6,233,360 B1 | 5/2001 | Metcalfe et al. | |
| 6,243,133 B1 | 6/2001 | Spaulding et al. | |
| 6,263,091 B1 | 7/2001 | Jain et al. | 382/125 |
| 6,282,317 B1 | 8/2001 | Luo et al. | 382/203 |
| 6,293,651 B1 | 9/2001 | Sawano | |
| 6,402,283 B2 | 6/2002 | Schulte | |
| 6,425,699 B1 | 7/2002 | Doval et al. | |
| 6,447,186 B1 | 9/2002 | Oguchi et al. | |
| 6,456,388 B1 | 9/2002 | Inoue et al. | |
| 6,462,835 B1 * | 10/2002 | Loushin et al. | 358/1.9 |
| 6,501,566 B1 | 12/2002 | Ishiguro et al. | |
| 6,537,410 B2 | 3/2003 | Arnost et al. | |
| 6,563,945 B2 | 5/2003 | Holm | |
| 6,567,111 B2 | 5/2003 | Kojima et al. | |
| 6,577,751 B2 | 6/2003 | Yamamoto | |
| 6,583,852 B2 | 6/2003 | Baum et al. | |
| 6,608,926 B1 | 8/2003 | Suwa | |
| 6,614,459 B2 | 9/2003 | Fujimoto et al. | |
| 6,628,417 B1 | 9/2003 | Naito et al. | |
| 6,628,823 B1 | 9/2003 | Holm | |
| 6,628,826 B1 | 9/2003 | Gilman et al. | |
| 6,628,899 B1 | 9/2003 | Kito | |
| 6,650,771 B1 | 11/2003 | Walker | |
| 6,661,443 B2 | 12/2003 | Bybell et al. | |
| 6,671,063 B1 | 12/2003 | Iida | |
| 6,690,488 B1 | 2/2004 | Reuman | |
| 6,694,051 B1 * | 2/2004 | Yamazoe et al. | 382/167 |
| 6,711,285 B2 * | 3/2004 | Noguchi | 382/162 |
| 6,760,489 B1 * | 7/2004 | Kuwata | 382/300 |
| 6,762,855 B1 | 7/2004 | Goldberg et al. | |
| 6,771,832 B1 | 8/2004 | Naito et al. | |
| 6,819,347 B2 | 11/2004 | Saquib et al. | |

| | | | | | | |
|---|---|---|---|---|---|---|
| 6,826,310 B2 * | 11/2004 | Trifonov et al. ............. 382/274 | JP | 2000050077 A | 2/2000 |
| 6,842,186 B2 | 1/2005 | Bouchard et al. | JP | 2000050080 A | 2/2000 |
| 6,906,736 B2 | 6/2005 | Bouchard et al. | JP | 2000 184270 | 6/2000 |
| 6,937,365 B2 | 8/2005 | Gorian et al. | JP | 2000-184270 | 6/2000 |
| 6,956,967 B2 * | 10/2005 | Gindele et al. ............. 382/167 | JP | 2001-160908 | 6/2001 |
| 6,999,202 B2 | 2/2006 | Bybell et al. | JP | 2001160908 A | 6/2001 |
| 7,050,194 B1 | 5/2006 | Someno et al. | JP | 2001 273112 | 10/2001 |
| 7,092,116 B2 | 8/2006 | Calaway | JP | 2002-199221 A | 7/2002 |
| 7,127,108 B2 | 10/2006 | Kinjo et al. | JP | 2002-247361 A | 8/2002 |
| 7,129,980 B1 * | 10/2006 | Ashida ................. 348/333.04 | JP | 2003 008986 | 1/2003 |
| 7,154,621 B2 | 12/2006 | Rodriguez et al. | JP | 2003-8986 | 1/2003 |
| 7,154,630 B1 | 12/2006 | Nimura et al. | KR | 2001-0037684 A | 5/2001 |
| 7,167,597 B2 * | 1/2007 | Matsushima ............... 382/274 | WO | WO 9734257 A1 | 9/1997 |
| 7,200,265 B2 * | 4/2007 | Imai .......................... 382/168 | WO | WO 99 53415 | 10/1999 |
| 7,224,476 B2 | 5/2007 | Yoshida | WO | WO00/04492 A3 | 1/2000 |
| 7,260,637 B2 | 8/2007 | Kato | WO | WO 01 01669 | 1/2001 |
| 7,272,390 B1 | 9/2007 | Adachi et al. | WO | WO 01 31432 | 5/2001 |
| 7,283,666 B2 | 10/2007 | Saquib et al. | WO | WO 02 078320 | 10/2002 |
| 7,336,775 B2 | 2/2008 | Tanaka et al. | WO | WO 02 096651 | 12/2002 |
| 7,355,732 B2 | 4/2008 | Yamaguchi | WO | WO 03/071780 | 8/2003 |
| 7,557,950 B2 | 7/2009 | Hatta et al. | WO | WO 2004/077816 | 9/2004 |
| 2001/0005222 A1 * | 6/2001 | Yamaguchi ................. 348/223 | WO | WO 2005 006200 | 1/2005 |
| 2003/0021478 A1 | 1/2003 | Yoshida | | | |
| 2004/0073783 A1 | 4/2004 | Ritchie | | | |
| 2004/0170316 A1 | 9/2004 | Saquib et al. | | | |
| 2004/0179226 A1 | 9/2004 | Burkes et al. | | | |
| 2004/0207712 A1 | 10/2004 | Bouchard et al. | | | |
| 2005/0005061 A1 | 1/2005 | Robins | | | |
| 2005/0219344 A1 | 10/2005 | Bouchard | | | |
| 2009/0128613 A1 | 5/2009 | Bouchard et al. | | | |

FOREIGN PATENT DOCUMENTS

| | | |
|---|---|---|
| EP | 0 619 188 | 10/1994 |
| EP | 0 625 425 | 11/1994 |
| EP | 0 626 611 | 11/1994 |
| EP | 0 454 495 | 7/1996 |
| EP | 0 791 472 | 2/1997 |
| EP | 0 762 736 A2 | 3/1997 |
| EP | 0 762 736 A3 | 3/1997 |
| EP | 0 773 470 A1 | 5/1997 |
| EP | 0 939 359 | 9/1999 |
| EP | 1 004 442 | 5/2000 |
| EP | 1 056 272 A1 | 11/2000 |
| EP | 1 078 750 | 2/2001 |
| EP | 1 137 247 | 9/2001 |
| EP | 1 201 449 | 10/2001 |
| EP | 1 392 514 | 9/2005 |
| EP | 0 933 679 | 4/2008 |
| GB | 2 356 375 | 5/2001 |
| JP | 58-164368 | 9/1983 |
| JP | 59-127781 | 7/1984 |
| JP | 63-209370 A | 8/1988 |
| JP | 01 040371 | 2/1989 |
| JP | 02-248264 | 10/1990 |
| JP | 02-289368 | 11/1990 |
| JP | 03-024972 | 2/1991 |
| JP | 4-119338 | 4/1992 |
| JP | 04119338 | 4/1992 |
| JP | 06 183033 | 7/1994 |
| JP | 06 266514 | 9/1994 |
| JP | 6-308632 | 11/1994 |
| JP | 06308632 A | 11/1994 |
| JP | 06-350888 A | 12/1994 |
| JP | 08 3076999 A | 11/1996 |
| JP | 9-138465 | 5/1997 |
| JP | 11 505357 A | 5/1997 |
| JP | 9138465 A2 | 5/1997 |
| JP | 09167129 | 6/1997 |
| JP | 11-055515 A | 2/1999 |
| JP | 11-275359 A | 10/1999 |
| JP | 2000-50077 | 2/2000 |
| JP | 2000-50080 | 2/2000 |

OTHER PUBLICATIONS

"Adaptive Margin Support Vector Machines" (XP-002299707), pp. 1-16, by Jason Weston and Ralf Herbrich.

"Algorithmic Stability and Sanity-Check Bounds for Leave-One-Out Cross-Validation" (XP-002299710), pp. 1-20, by Michael Kearns and Dana Ron, Jan. 1997.

Damera-Venkata et al., "Adaptive Threshold Modulation for Error Diffusion Halftoning," IEEE Trans. On Image Processing, 2001, 10(1), 104-116.

Gonzalez et al., "Digital Image Processing," Addison-Wesley, 1977, 119-126.

Hann, R.A. et al., "Chemical Technology in Printing and Imaging Systems", *The Royal of Society Chemistry, , Special Publication*. 133 (1993), pp. 73-85.

Hann, R.A. et al., "Dye Diffusion Thermal Transfer (D2T2) Color Printing", *Journal of Imaging Technology*., 16 (6). (1990), pp. 238-241.

Knox et al., "Threshold Modulation in Error Diffusion," SPIE, 1993, 2(3), 185-192.

Taguchi et al., "New Thermal Offset Printing Employing Dye Transfer Technology (Tandem TOP-D)," *NIP17: International Conference on Digital Printing Technologies*, Sep. 2001, vol. 17, pp. 499-503.

Pratt, W.K., "Digital Image Processing," Wiley & Sons, 1978, 311-318.

Ulichney, R., "Digital Halftoning," Cambridge, MA, MIT Press, (1987), Chapters 5 and 6, pp. 239-319 p. 341.

Wong, P.W., "Adaptive Error Diffusion and Its Application in Multiresolution Rendering," IEEE Trans. On Image Processing, 1996, 5(7), 1184-1196.

United States Patent and Trademark Office: Restriction Requirement dated Sep. 30, 2003, U.S. Appl. No. 10/078,644, filed Feb. 19, 2002.

United States Patent and Trademark Office: Restriction Requirement dated Oct. 2, 2003, U.S. Appl. No. 10/080,883, filed Feb. 2, 2002.

United States Patent and Trademark Office: Non-Final Office Action dated Mar. 29, 2004, U.S. Appl. No. 10/080,883, filed Feb. 22, 2002.

United States Patent and Trademark Office: Non-Final Office Action dated Sep. 22, 2004, U.S. Appl. No. 10/078,644, filed Feb. 19, 2002.

United States Patent and Trademark Office: Notice of Allowance dated Sep. 23, 2004, U.S. Appl. No. 10/080,883, filed Feb. 22, 2003.

United States Patent and Trademark Office: Non-Final Office Action dated Nov. 29, 2004, U.S. Appl. No. 09/817,932, filed Mar. 27, 2001.

United States Patent and Trademark Office: Non-Final Office Action dated Nov. 29, 2004, U.S. Appl. No. 09/870,537, filed May 30, 2001.

United States Patent and Trademark Office: Notice of Allowance dated Feb. 22, 2005, U.S. Appl. No. 10/078,644, filed Feb. 19, 2002.

United States Patent and Trademark Office: Notice of Allowance dated May 9, 2005, U.S. Appl. No. 09/870,537, filed May 30, 2001.

United States Patent and Trademark Office: Notice of Allowance dated Aug. 31, 2005, U.S. Appl. No. 09/817,932, filed Mar. 27, 2001.

United States Patent and Trademark Office: Non-Final Office Action dated Jul. 13, 2006, U.S. Appl. No. 10/375,440, filed Feb. 27, 2003.
United States Patent and Trademark Office: Final Office Action dated Dec. 4, 2006, U.S. Appl. No. 10/375,440, filed Feb. 27, 2003.
United States Patent and Trademark Office: Notice of Allowance dated May 29, 2007, U.S. Appl. No. 10/375,440, filed Feb. 27, 2003.
United States Patent and Trademark Office: Restriction Requirement dated Jun. 29, 2007, U.S. Appl. No. 10/611,737, filed Jul. 1, 2003.
United States Patent and Trademark Office: Restriction Requirement dated Sep. 4, 2007, U.S. Appl. No. 10/844,286, filed May 12, 2004.
United States Patent and Trademark Office: Notice of Allowance dated Sep. 6, 2007, U.S. Appl. No. 10/375,440, filed Feb. 27, 2003.
United States Patent and Trademark Office: Non-Final Office Action dated Oct. 4, 2007, U.S. Appl. No. 10/611,737, filed Jul. 1, 2003.
United States Patent and Trademark Office: Non-Final Office Action dated Nov. 14, 2007, U.S. Appl. No. 10/844,286, filed May 12, 2004.
United States Patent and Trademark Office: Non-Final Office Action dated Mar. 20, 2008, U.S. Appl. No. 10/844,286, filed May 12, 2005.
United States Patent and Trademark Office: Non-Final Office Action dated Jun. 18, 2008, U.S. Appl. No. 10/611,737, filed Jul. 1, 2003.
United States Patent and Trademark Office: Final Office Action dated Sep. 12, 2008, U.S. Appl. No. 10/844,286, filed May 12, 2004.
United States Patent and Trademark Office: Final Office Action dated Jan. 28, 2009, U.S. Appl. No. 10/611,737, filed Jul. 1, 2003.
United States Patent and Trademark Office: Non-Final Office Action dated May 21, 2009, U.S. Appl. No. 10/844,286, filed May 12, 2004.
United States Patent and Trademark Office: Non-Final Office Action dated Jun. 10, 2009, U.S. Appl. No. 10/611,737, filed Jul. 1, 2003.
United States Patent and Trademark Office: Non-Final Office Action dated Jul. 31, 2009, U.S. Appl. No. 12/031,151, filed Feb. 14, 2008.
United States Patent and Trademark Office: U.S. Appl. No. 11/847,894, filed Aug. 30, 2007, Gorian et al.
United States Patent and Trademark Office: U.S. Appl. No. 12/031,151, filed Feb. 14, 2008, Bybell.
International Preliminary Examination Report (IPER) dated Jun. 30, 2003, PCT/US02/015546.
EP Communication issued by the Examining Division Apr. 2, 2004, EP1392514.
International Preliminary Examination Report (IPER) issued Sep. 2, 2005, PCT/US04/004964.
EP Communication issued by the Examining Division Jan. 11, 2006, EP1597911.
EP Communication issued by the Examining Division May 23, 2006, EP1597911.
International Preliminary Examination Report (IPER) issued Jan. 3, 2006, PCT/US04/020981.
International Preliminary Examination Report (IPER) dated Sep. 17, 2003, PCT/US02/015913.
EP Communication issued by the Examining Division May 29, 2009, EP1479220.
International Preliminary Examination Report (IPER) dated Jan. 29, 2003, PCT/US02/008954.
EP Communication issued by the Examining Division Jul. 7, 2009, EP1374557.
United States Patent and Trademark Office: Non-Final Office Action dated Sep. 30, 2009, U.S. Appl. No. 11/847,894, filed Aug. 30, 2007.

* cited by examiner

DIGITAL IMAGE EXPOSURE CORRECTION

CROSS-REFERENCE TO RELATED APPLICATION

This is a divisional application of prior application Ser. No. 10/375,440, filed Feb. 27, 2003 by Saquib et al. and entitled "DIGITAL IMAGE EXPOSURE CORRECTION".

BACKGROUND

1. Field of the Invention

The present invention relates to digital image processing and, more particularly, to correcting the exposure of digital images.

2. Related Art

It is essential to properly expose a digital image to obtain a good quality rendition of the original scene on an output device such as a monitor or a printer. The "exposure" of a digital image refers to the quantity of light allowed to act on the image capture sensor; exposure is a product of the intensity (controlled by the aperture and intensity of the illuminant) and the duration (controlled by the shutter speed) of light striking the sensor. Large exposure values will result in brighter images and vice versa. Relying on the original exposure set by the input device (e.g., a digital camera) usually does not yield the best quality for several reasons. For example, a wide variety of picture-taking conditions and scene compositions may make the original exposure quite variable and differ from the preferred exposure. Furthermore, input devices typically have limited dynamic range and therefore err on the side of under-exposing an image to avoid losing information in an image due to clipping. Although underexposed images may appear darker than desired, they tend to retain more information than overexposed images and therefore are amenable to post-acquisition exposure correction to make them more suitable for printing or displaying on an output device.

It is desirable that output devices be equipped to produce properly-exposed renderings from images acquired using a variety of (possibly unknown) image acquisition devices. For example, a desktop digital photo printer or a photo-vending kiosk may be capable of receiving digital images acquired using any of a wide variety of digital cameras, scanners, or other input devices under a wide variety of conditions. It is desirable that such a printer or kiosk be capable of correcting the exposure of any images it receives so that such images may be printed with optimal exposures.

What is needed, therefore, are improved techniques for correcting the exposure of digital images.

SUMMARY

Techniques are disclosed for correcting the exposure of a digital image. An exposure predictor may be generated based on a set of images for which ground truth data are known. An optimal feature set may be identified that strikes a balance between minimizing prediction error and producing good results across a wide range of images. The exposure of an image may be corrected by extracting values of the selected optimal features from the image, using the predictor to predict a desired exposure correction for the image, and correcting the exposure of the image by the predicted desired amount. To facilitate the exposure correction, we propose a model that relates intensity of light in the world to the RGB digits of the digital image. This model comprises a gamma function that models the response of a typical monitor and a S-shaped curve that allows us to compress the large dynamic range of the world to the small dynamic range of the RGB digit space. The exposure of the image may then be corrected by employing the inverse of this model to transform the image to logarithmic intensities in the world, adding or subtracting an offset (given by the desired exposure correction) from the image, and then mapping the image back to the RGB digit space using the above model. For example, in one aspect of the present invention, a method is provided for correcting the exposure of a source image. The method includes steps of: (A) transforming the source image from an image capture space into a nonlinear intensity space to produce a first transformed image; (B) correcting the exposure of the transformed image in the nonlinear intensity space to produce a corrected transformed image; and (C) transforming the corrected transformed image into the image capture space to produce a second transformed image. The step (C) may include steps of: (C)(1) transforming the corrected transformed image into a third transformed image using an S-shaped curve; and (C)(2) transforming the third transformed image into the second transformed image using a gamma function.

If i represents an intensity in the nonlinear intensity space, the step (C) may include a step of transforming the corrected transformed image into the second transformed image using the formula:

$$T(i)=(A+B \tan h(-s(i+o)))^{1/\gamma},$$

the step (A) may transform gray level g in the source image by applying the function $T^{-1}(g)$ to the gray level to produce transformed intensities, and the step (B) may include a step of adding an exposure offset $\Delta e$ to the transformed intensities to produce corrected transformed intensities.

In another aspect of the present invention, a method is provided for processing an image. The method includes steps of: (A) extracting from the image values of at least one feature selected from a set of features including: a thumbnail of the image, a luminance channel of the image, a region of interest in the image, and a subset of the image including a plurality of pixels satisfying an activity threshold; (B) predicting a desired exposure correction of the image based on the extracted feature values; and (C) correcting the exposure of the image by the predicted exposure correction to produce an exposure-corrected image. The set of features may include other features instead of or in addition to the features just listed.

The region of interest may have the following properties: (1) the average activity within the region is above a predetermined minimum activity threshold; and (2) the absolute logarithm of the ratio of the average luminance of the region to the average luminance of that portion of the image not including the region is the highest such absolute logarithm for a predetermined plurality of regions in the image. The region of interest may have a base size that is proportional to the dimensions of the image, and the dimensions of the region of interest may be proportional to the base size multiplied by a measure of average activity in the image.

In another aspect of the present invention, a method is provided for selecting a set of features for use in a system for adjusting the exposure of images. The method includes steps of: (A) placing a set of features in a master feature set M; (B) initializing a current feature set C to a null value; (C) for each feature F in the master set M, performing steps of: (1) placing the union of the current feature set C and the feature F in a temporary feature set S; (2) computing a leave-n-out error E for a plurality of images using set S as a feature set; (3) if the error E is less than a minimum error $E_{MIN}$, assigning the value of E to $E_{MIN}$ and recording the identity of feature F in a variable $F_{MIN}$; (D) if $E_{MIN}$ is less than a global error $E_G$, assigning the value of $E_{MIN}$ to $E_G$, adding the feature F recorded in $F_{MIN}$ to the set C, and deleting the feature F recorded in $F_{MIN}$ from the set M; (E) if the set M is not empty, returning to step (C); and (F) if the set M is empty or the value of $E_{MIN}$ is greater than the value of $E_G$, selecting the set C as the set of features for use in the system for adjusting the exposure of images.

Other features and advantages of various aspects and embodiments of the present invention will become apparent from the following description and from the claims.

DETAILED DESCRIPTION

In general, the exposure correction algorithm disclosed herein may be divided into two parts. The first part extracts, from the input image, the values of a set of features that contain the information that is most relevant to the exposure of the image. The second part finds a predictor that operates on the extracted features to generate a predicted exposure correction to apply to the image. The predicted exposure correction is applied to the image to produce an exposure-corrected image. The predictor may, for example, be a linear predictor that is chosen so that the error between the predicted exposure and desired exposure of images is minimized in a least square sense. Since the theory for generating the best linear predictor is well known in the statistical and signal processing arts, the disclosure herein will emphasize techniques both for identifying good features that correlate very well with the desired exposure and for determining an optimal feature set that yields the best linear predictor given the ground truth data.

Figure 1A:
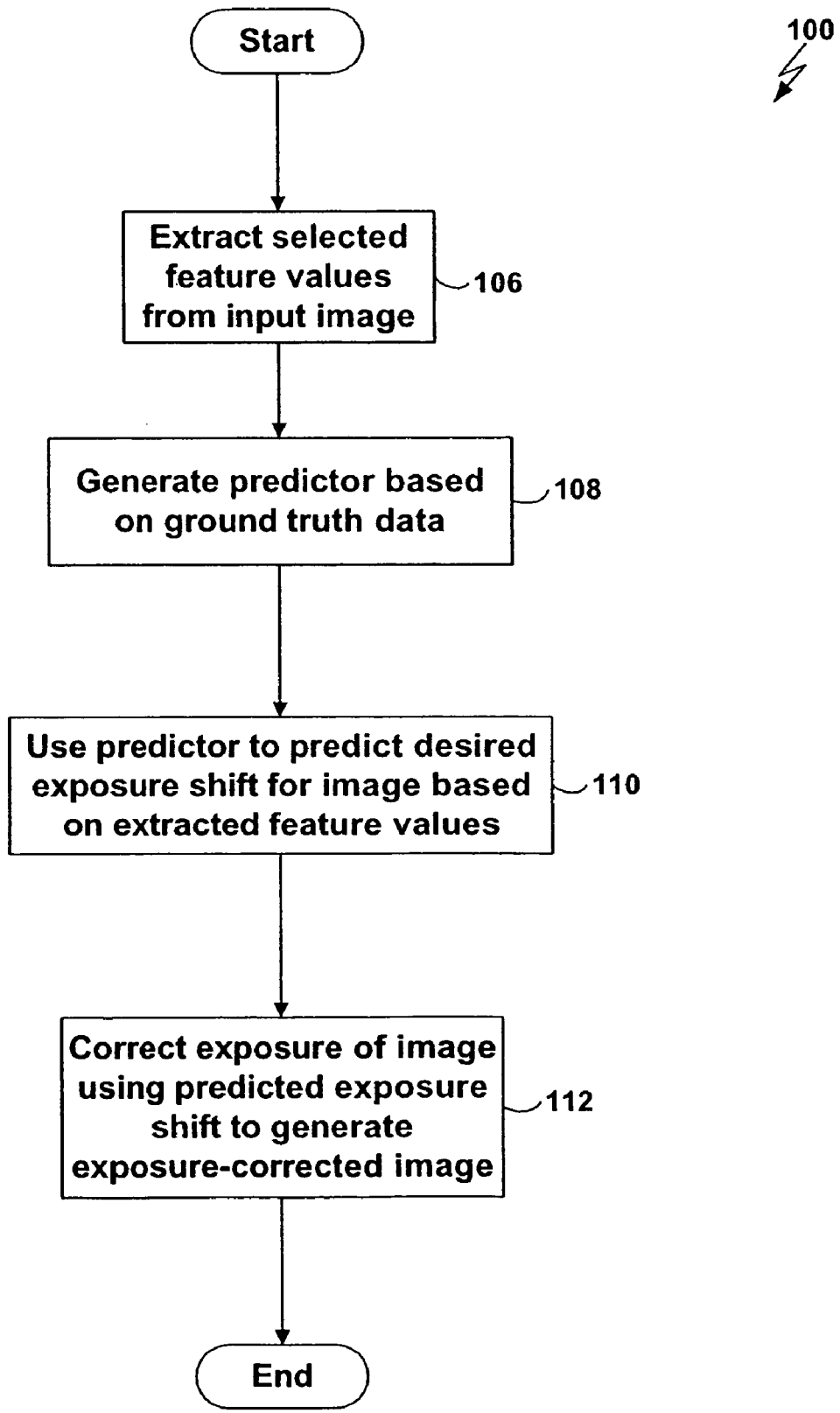
FIG. 1A is a flowchart of a method for correcting the exposure of an image according to one embodiment of the present invention.
Figure 2A:
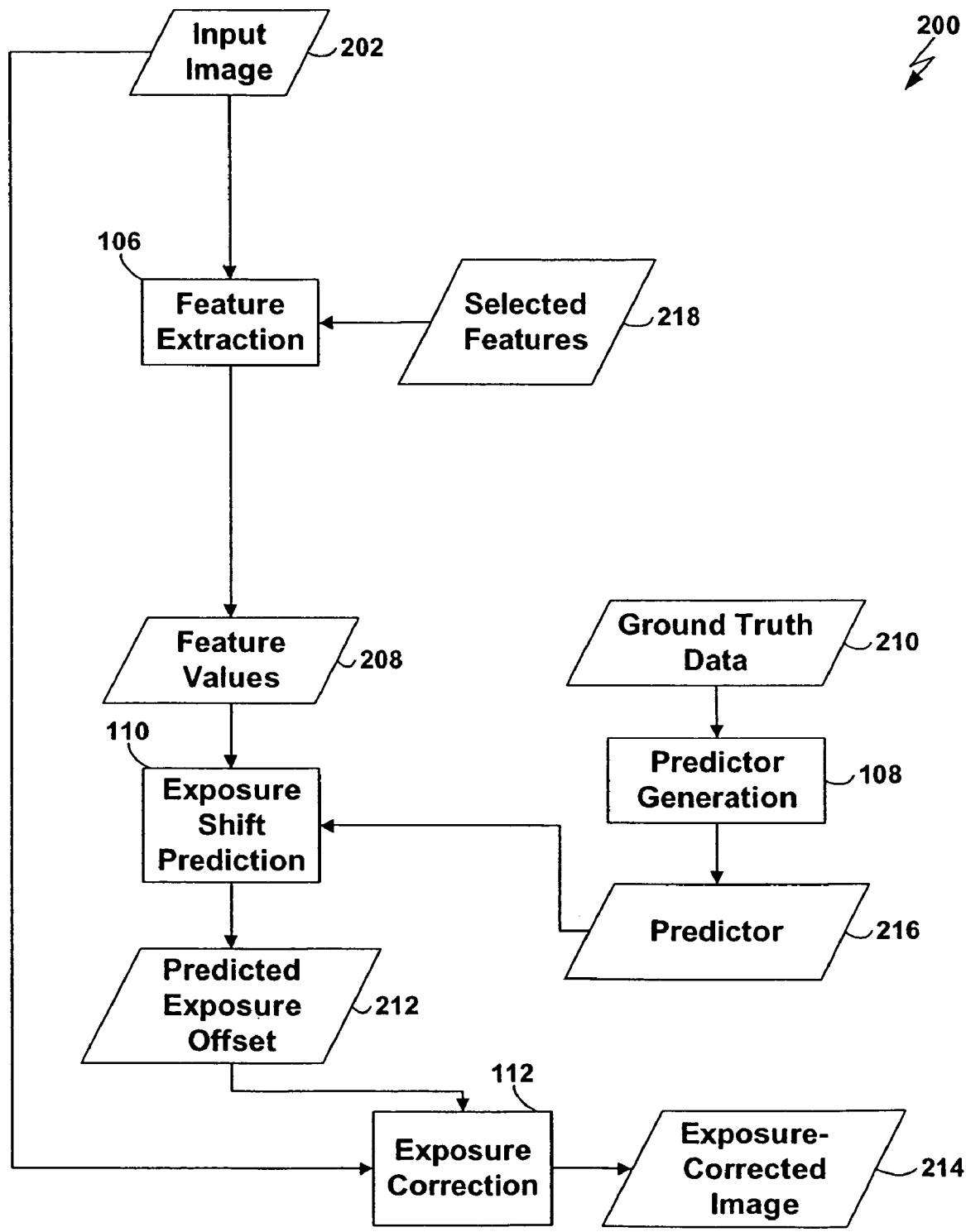
FIG. 2A is a dataflow diagram illustrating operations performed by the method shown in FIG. 1A.

Referring to FIG. 1A, a flowchart is shown of a method 100 for correcting the exposure of an image according to one embodiment of the present invention. Referring to FIG. 2A, a dataflow diagram 200 is shown which illustrates the operations performed by the method 100 shown in FIG. 1A.

The method 100 operates on an input image 202 (FIG. 2A), which may be received from any of a variety of sources such as a digital camera or scanner. The input image 202 may be represented in any of a variety of formats for representing digital images, such as the JPEG format.

The method 100 extracts from the image 202 the values 208 of a set of selected features 218 (step 106). The selected features 218 may, for example, be identifiers or other descriptors which identify the particular features to be extracted in step 106. Examples of features that may be extracted in step 106, and examples of techniques for extracting them, will be described below with respect to FIG. 1B, FIG. 1C, FIG. 2C, FIG. 3, and FIG. 4. Techniques that may be used to select the set of features 218 will be described below with respect to FIG. 9.

The method 100 generates a predictor 216 based on ground truth data 210 for a set of ground truth images (step 108). Note that step 108 need not be performed each time the method 100 is performed. Rather, the predictor 216 may be generated once, prior to execution of the method 100. The generated predictor 216 may then be used each time the method 100 is performed, without the need to perform step 108. Techniques that may be used to generate the predictor 216 will be described below with respect to FIGS. 5-9. The method 100 uses the predictor 216 to generate a predicted exposure offset 212 based on the extracted feature values 208 (step 110).

The method 100 corrects the exposure of the input image 202 by shifting the exposure of the input image 202 by the predicted exposure offset 212, thereby producing an exposure-corrected image 214 (step 112). Techniques that may be used to perform the exposure correction will be described below with respect to FIG. 11.

Various techniques may optionally be applied to improve the contrast of the image 202. For example, the range of intensities in the image 202 may be stretched to cover the range of available intensities (e.g., [0,255]) as follows. The red channel R of the input image 202 may be linearized, thereby producing a linearized red channel $R_L$, using the formula $R_L=(R/255)^\gamma$. Linearized green and blue channels $G_L$ and $B_L$ may be produced similarly. Applying the gamma function to the RGB space image 202 transforms it to a linear intensity space that more closely reflects the original dynamic range of the image 202. The term "RGB space" as used herein refers to any space in which an image may be captured (referred to herein as an "image capture space").

A minimum intensity value mn and a maximum intensity value mx for the image 202 may be obtained using the following formulas: mn=min ($R_L$, $G_L$, $B_L$) and mx=max($R_L$, $G_L$, $B_L$). The linearized red channel $R_L$ may be stretched to produce a stretched linearized red channel $R_L'$ using the formula $R_L'=(R_L-mn)/(mx-mn)$. Stretched linearized green and blue channels $G_L'$ and $B_L'$ may be produced similarly. Subsequent operations (such as feature extraction) described below may be performed on the channels $R_L'$, $G_L'$, and $B_L'$.

The channel $R_L'$ may be transformed back into the channel R' using the formula $R=255(R_L')^{1/\gamma}$. The channels G' and B' may be obtained from the channels $G_L'$ and $B_L'$ in a similar manner. In the following description, operations that are described as being performed on channels $R_L$, $G_L$, and $B_L$ or R, G, and B may alternatively be performed on channels $R_L'$, $G_L'$, and $B_L'$ or R', G', and B'.

The present invention may be used in conjunction with any individual features and with any combination of features. Examples of techniques that may be used to select an optimal set of features for extraction, from among an initial set of features, will be described below with respect to FIG. 9. Once a particular set of features is selected using such techniques, values 208 of the selected features 218 may be extracted from the image 202 (step 106). Particular examples of features that may be used in conjunction with embodiments of the present invention, and techniques for extracting values of such features, will now be described.

In one embodiment of the present invention, the size of the input image 202 is reduced as a part of feature extraction. The input image 202 may be reduced because, in general, any particular image may carry a significant amount of information that is irrelevant to its desired exposure. For example, the chrominance channels of a color image are independent of the exposure of the image and therefore do not yield any information regarding the desired exposure. Such extraneous information may be discarded both to reduce the computational complexity of the exposure correction techniques described herein and to accurately estimate the coefficients 526 (FIG. 6) of the predictor 216, as described in more detail below. Failure to exclude such extraneous information may decrease the accuracy of coefficient estimation because, in practice, there is only a limited training image set for which the desired exposure (ground truth) is known. This tends to bias the estimation of the predictor coefficients 526 when the number of images in the training set 716 (FIG. 7D) cannot adequately support the number of selected features in the feature set 208. Determining the optimal number of features is an important and difficult problem, and will be described in more detail below with respect to FIG. 9.

Figure 1B:
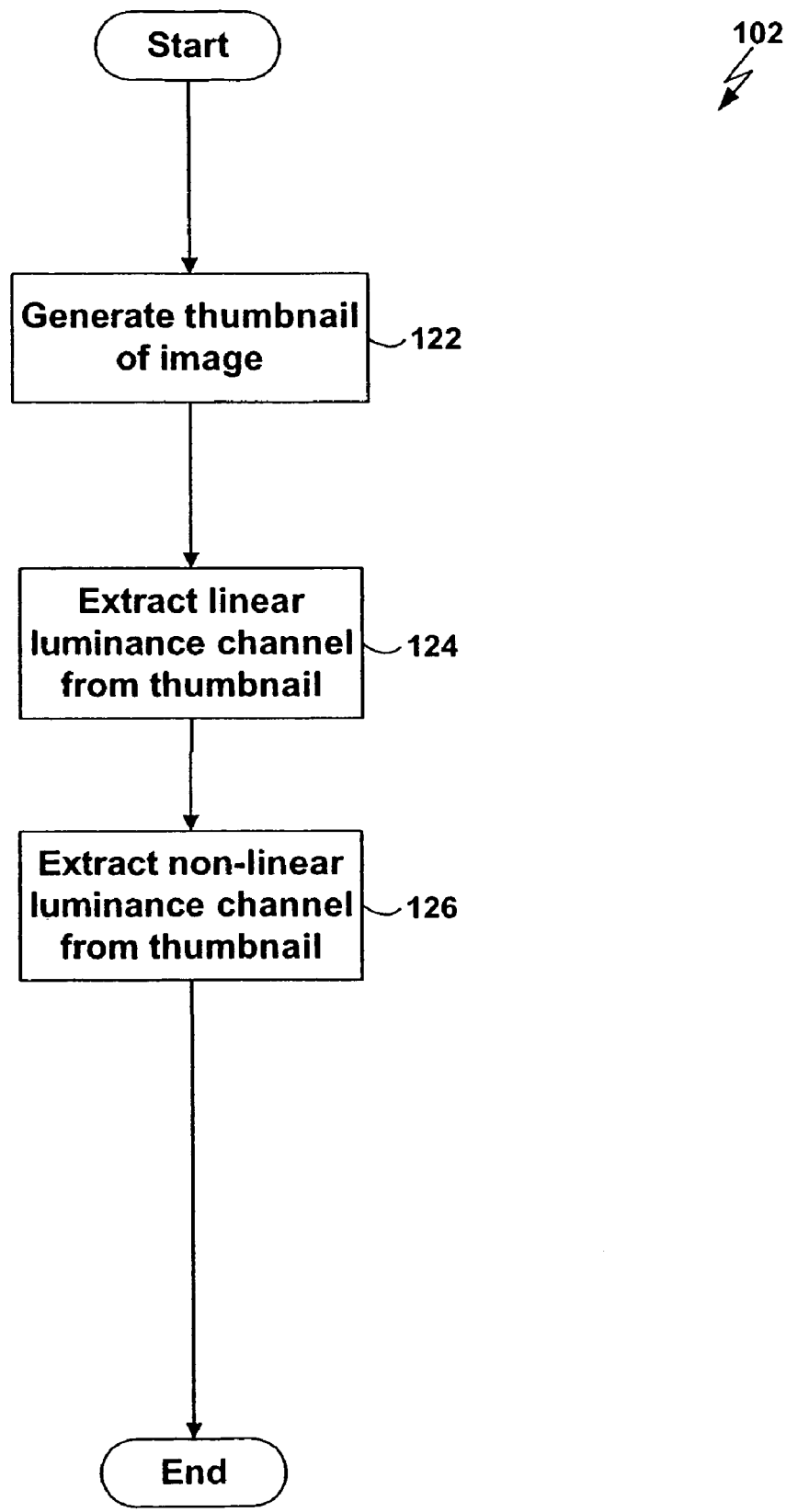
FIG. 1B is a flowchart of a method for reducing an image according to one embodiment of the present invention.
Figure 2B:
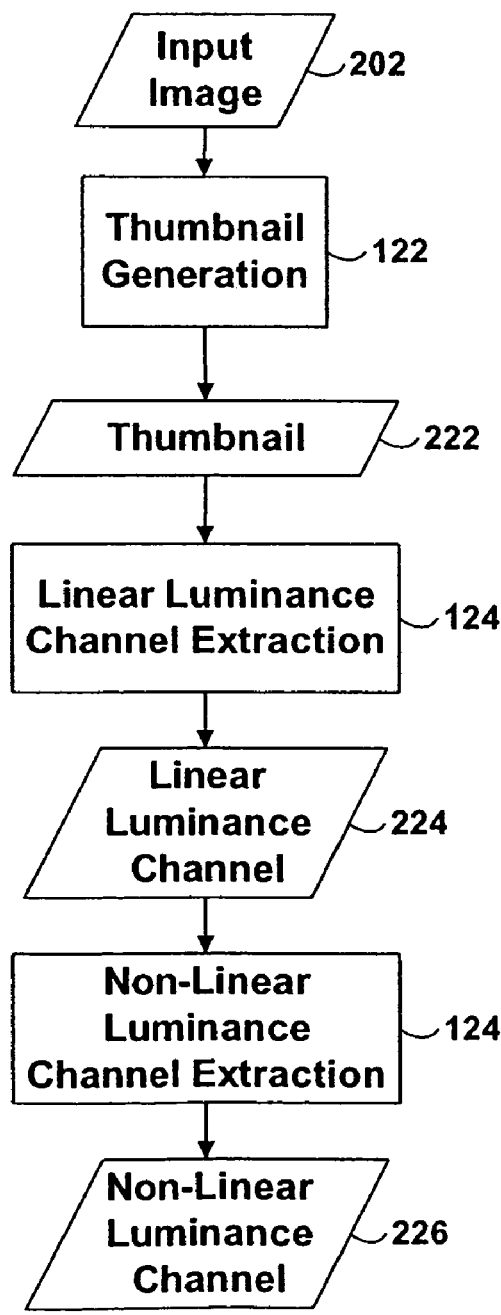
FIG. 2B is a dataflow diagram illustrating operations performed by the method shown in FIG. 1B.

Referring to FIG. 1B, a flowchart is shown of a method that may be used to reduce the image 202 according to one embodiment of the present invention. Referring to FIG. 2B, a dataflow diagram 220 is shown which illustrates the operations performed by the method 102 shown in FIG. 1B. The method 102 generates a thumbnail 222 of the input image 202 (step 122). In general, a thumbnail of an image is a reduced-dimension version of the image that is produced by some form of downsampling. Techniques for producing thumbnails are well-known to those of ordinary skill in the art.

In one embodiment of the present invention, it is assumed that most of the exposure information in the input image 202 is contained in the luminance channel of the image 202. The method 102 therefore extracts a linear luminance channel 224 (step 124) and a non-linear luminance channel 226 (step 126) from the thumbnail 222 so that subsequent processing is performed only on the linear luminance channel 224 and the non-linear luminance channel 226. If, for example, the R, G, and B channels of the input image 202 have been linearized into channels $R_L$, $G_L$, and $B_L$, respectively, the linear luminance channel 224 and non-linear luminance channel 226 may be produced as follows. The linearized luminance channel 224, represented by $L_L$, may be produced using the formula $L_L=aR_L+bG_L+cB_L$, where a, b, and c are constants. The non-linear luminance channel 226, represented by L, may be produced from the linearized luminance channel 224 $L_L$ by the following formula: $L=255(L_L)^{1/\gamma}$.

Figure 1C:
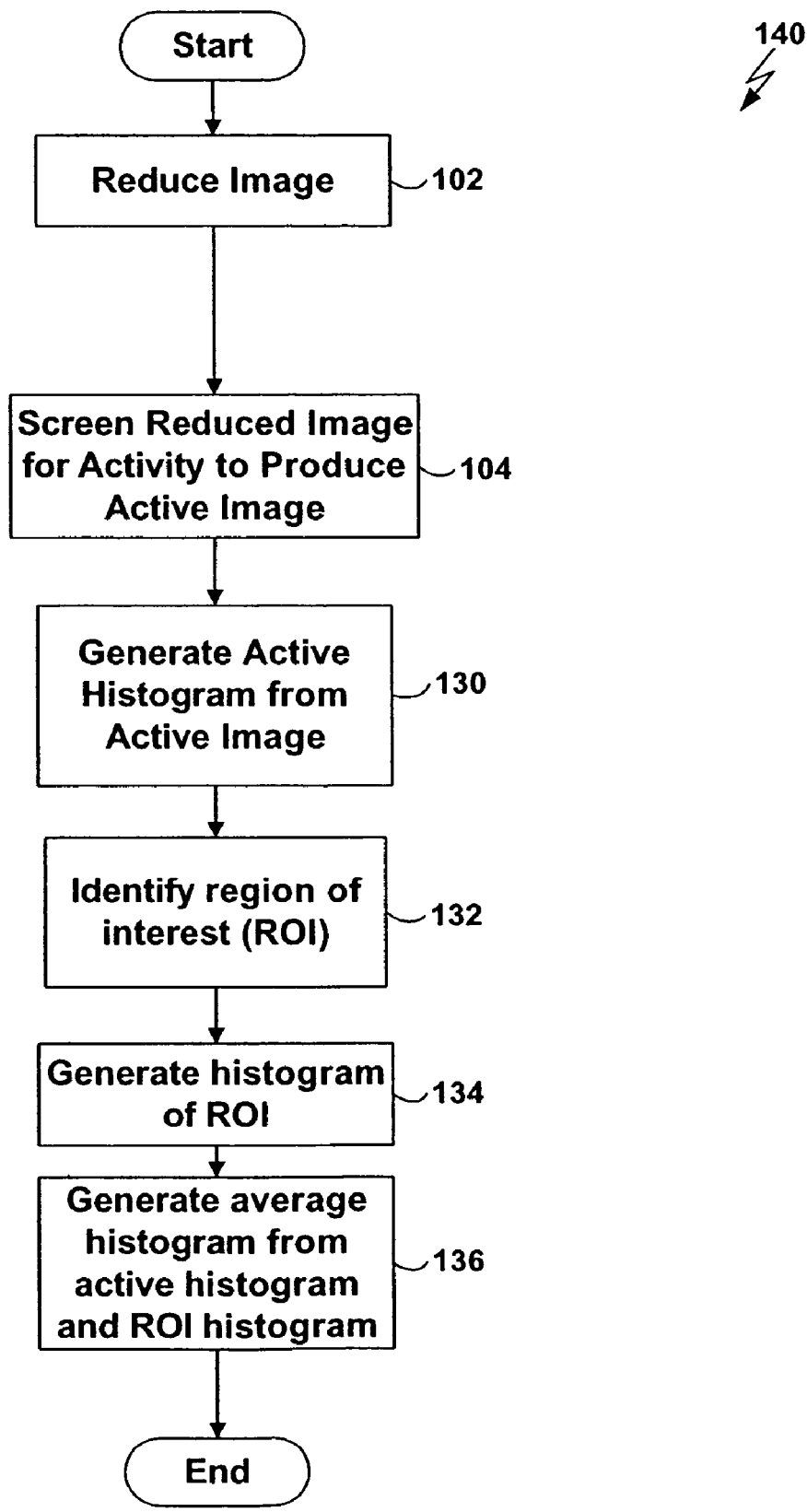
FIG. 1C is a flowchart of a method for extracting features from an image according to one embodiment of the present invention.
Figure 2C:
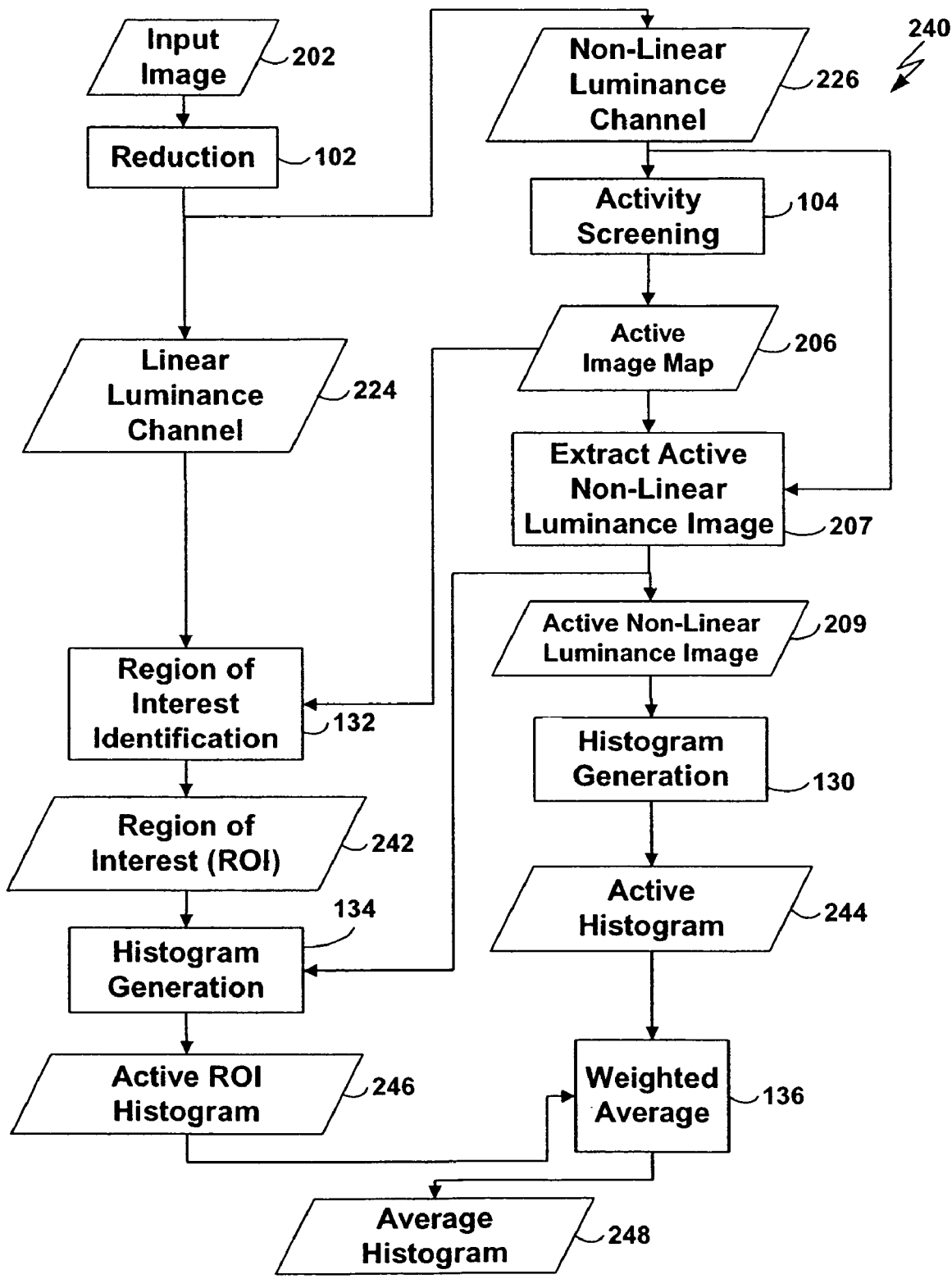
FIG. 2C is a dataflow diagram illustrating the operations performed by the method shown in FIG. 1C.

Referring to FIG. 1C, a flowchart is shown of a method that may be used to extract additional features from the input image 202 according to one embodiment of the present invention. Referring to FIG. 2C, a dataflow diagram 240 is shown which illustrates the operations performed by the method 140 shown in FIG. 1C. The input image 202 is reduced to produce the linear luminance channel 224 and the non-linear luminance channel 226 using the techniques described above with respect to FIGS. 1B and 2B (step 102).

A subset of the non-linear luminance channel 226 may be isolated to improve the performance of the predictor 216. A subset of the non-linear luminance channel 226, for example, rather than the entire non-linear luminance channel 226, may be used for exposure correction based on the observation that, in the typical case, all parts of an image do not equally influence our subjective judgment of the image's preferred exposure. For example, the desired exposure of an image with a subject standing in front of flat texture-less wall will most likely not be determined by the luminance values of the wall. The performance of the predictor 216 may therefore be improved by not using the wall pixels to compute the histogram described below. Although the factors that influence exposure are highly subjective, we have found that objects with little or no "activity" typically do not influence exposure. The non-linear luminance channel 226 may therefore first be screened for activity to produce an active image map 206 which identifies the locations of pixels in the non-linear luminance channel 226 that satisfy the activity threshold (step 104).

An active non-linear luminance image 209 may be extracted 207 from the non-linear luminance channel 226 based on the active image map 206. The active image 209 may also be referred to as the "active luminance channel" in embodiments which operate only upon the non-linear luminance channel 226 of the input image 202. Techniques that may be used to measure activity are described in more detail in commonly-owned U.S. Pat. No. 5,724,456 to Boyack et al., entitled "Brightness Adjustment of Images Using Digital Scene Analysis," issued on Mar. 3, 1998 and incorporated by reference herein.

The method 140 generates a histogram 244 (referred to as the "active histogram," or as the "active luminance histogram" (ALH) in embodiments in which only the luminance channel is being used) based on the active image 209 (step 130). The active histogram 244 is one example of a feature whose value may be extracted in step 106.

Using the entire active histogram 244 as a feature, however, may be inadequate to deal with images that are shot outdoors with the subject against a brightly lit background or with images that are shot indoors using the camera flash. Such images are distinguished by the fact that the exposures of the subject and background differ significantly from each other. If the subject occupies a small fraction of the image and there is sufficient activity in the background, an exposure predictor generated using the entire active histogram 244 will favor the background, thereby underexposing the subject in the outdoor case and overexposing the subject in the indoor case.

To address this problem, we introduce the concept of a region of interest (ROI): an area of the reduced image 204 that is most likely to determine the exposure of the original input image 202. The method 140 may identify a region of interest 242 using the linear luminance channel 224 and the active image map 206 (step 132). The method 140 may then generate a histogram 246 of the portion of the active image 209 that is within the identified region of interest 242 (step 134). Both the active histogram 244 and the ROI histogram 246 are examples of features that may be extracted in step 106.

The method 140 may also generate an average histogram 248 by taking the weighted average of the ROI histogram 246 and the active histogram 244 (step 136). The average histogram is another example of a feature that may be extracted in step 106. Techniques for generating the average histogram 248 will be described below with respect to FIG. 4.

Examples of techniques will now be described for using a variable-size rectangular window to search for and identify the ROI 242 of the thumbnail image 222 (step 132). In one embodiment of the present invention, the ROI 242 is defined as a rectangular window that satisfies the following conditions:

(1) the average activity within the ROI 242 (defined as the ratio of the number of active pixels in the ROI to the total number of pixels in the ROI) is above a specified minimum activity threshold $A_{MIN}$; and (2) the absolute logarithm of the ratio of the average linear luminance within the ROI to the average linear luminance of the remaining image (i.e., the portion of the linearized luminance channel 224 not including the ROI 242) is the highest in the thumbnail image 222.

In this embodiment, the average luminance is computed over all the pixels in the linearized luminance channel 224 and not just the pixels in the active image 206.

Condition (1) ensures that the ROI 242 encompasses some interesting content of the thumbnail image 222. Condition (2) serves to identify the subject in in-door flash scenes and out-door backlit scenes. For scenes in which there are no significant differences in luminance between any one portion of the linearized luminance channel 224 as compared to the rest of the linearized luminance channel 224, the ROI 242 encompasses an arbitrary region of the luminance channel 226 satisfying both condition (1) and (2). However, in this case the ROI 242 will not have any significant contribution to the exposure of the final exposure-corrected image 214, a property that will become clear from the description below.

Figure 3:
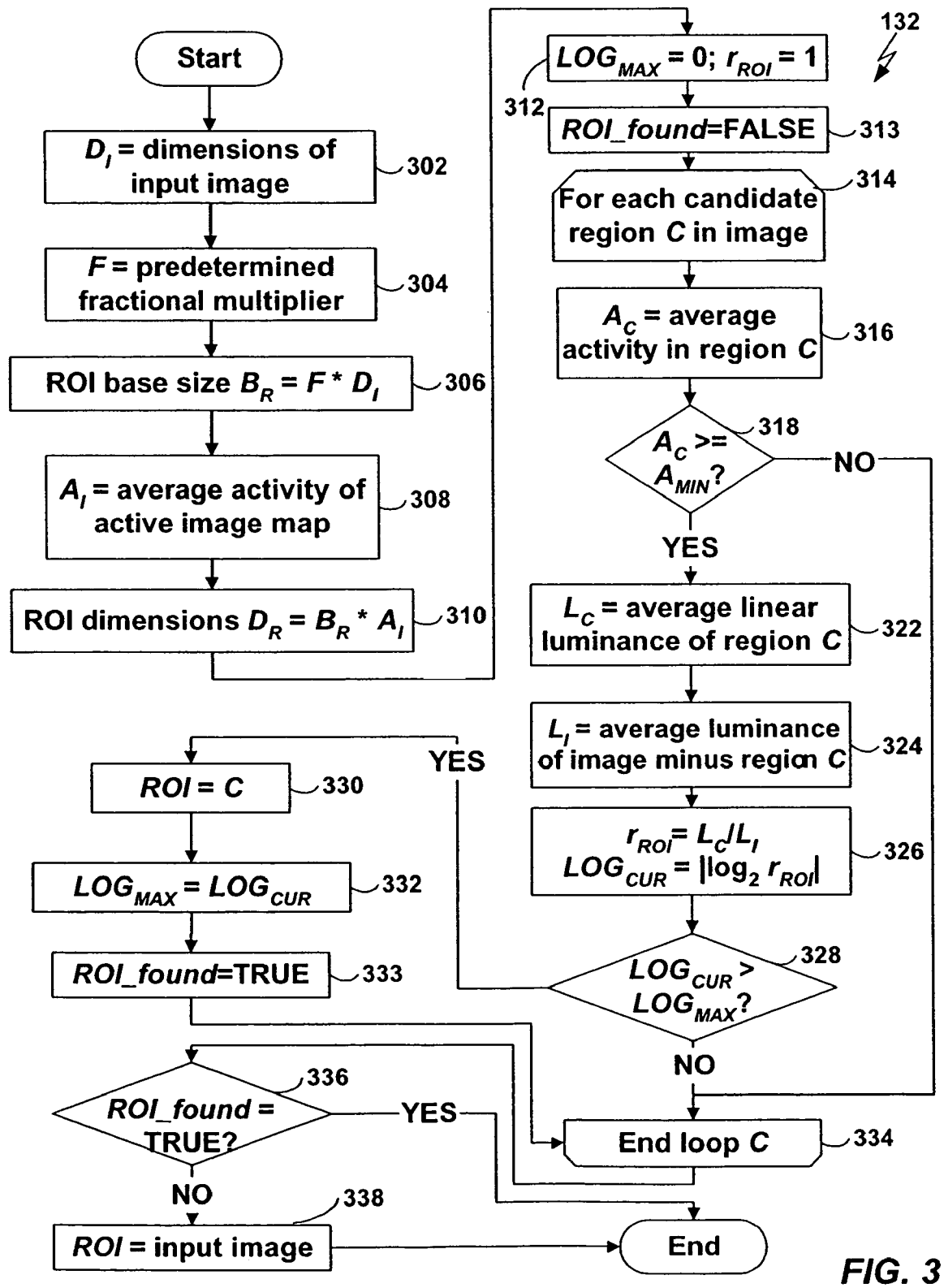
FIG. 3 is a flowchart of a method for identifying a region of interest in an image according to one embodiment of the present invention.

Referring to FIG. 3, a flowchart is shown of techniques that may be used to identify the region of interest 242 (step 132). First, the dimensions DR (e.g., width and height) of the region of interest 242 are selected. The aspect ratio of the region of interest 242 may be the same as the aspect ratio of the thumbnail 222, and the base dimensions of the region of interest 242 may be equal to a fixed fraction of the dimensions of the thumbnail 222. For example, if $D_I$ represents the dimensions of the thumbnail 222 (step 302) and F is a predetermined fractional multiplier (step 304), the base size $B_R$ of the region of interest 242 may be set equal to $F*D_I$ (step 306).

The actual dimensions $D_R$ of the region of interest 242 scale linearly from the base dimensions $B_R$ with the average activity of the non-linear luminance channel 226. In other words, if $A_I$ is the average activity of the entire active image map 206 (step 308), then the dimensions $D_R$ of the region of interest 242 are equal to $B_R*A_I$ (step 310). Intuitively, an image with sparse activity will tend to have a small region of interest and vice versa. The scaling property represented by step 310 also helps the region of interest 242 to pass condition (1).

Having selected the dimensions $D_R$ of the region of interest 242, a region that satisfies both conditions (1) and (2), stated above, may be selected as the region of interest 242. Referring again to FIG. 3, the region of interest 242 may be selected as follows.

A variable $LOG_{MAX}$ is initialized to zero and a variable $r_{ROI}$ is initialized to one (step 312). The meaning of the values of $LOG_{MAX}$ and $r_{ROI}$ will become clear below. The method 132 sets the value of a variable ROI_found to FALSE (step 313). As its name implies, ROI_found indicates whether the method 132 has yet found a region of interest.

The method 132 enters a loop over each candidate region C in the thumbnail 222 (step 314). The average activity $A_C$ of the region C is calculated (step 316). The method 132 determines whether $A_C \geq A_{MIN}$ (step 318), thereby determining whether condition (1) is satisfied. If $A_C < A_{MIN}$, the method 132 continues to the next region (step 334).

If $A_C \geq A_{MIN}$, the method 132 calculates the average luminance $L_C$ of region C of the linear luminance channel 224 (step 322) and the average linear luminance $L_I$ of the remainder of the linear luminance channel 224 (i.e., of the portion of the linear luminance channel 224 not including region C) (step 324). The ratio of $L_C$ to $L_I$ is assigned to the variable $r_{ROI}$, and the absolute logarithm of $r_{ROI}$ (i.e., |log$_2$ $L_C/L_I$|) is calculated and assigned to a variable named $LOG_{CUR}$ (step 326).

The method 132 determines whether the value of $LOG_{CUR}$ is greater than the value of $LOG_{MAX}$ (step 328). In other words, the method 132 determines whether the absolute log of the ratio of the average luminance in region C to the average luminance of the remainder of the linear luminance channel 224 is the highest encountered so far in the linear luminance channel 224. If $LOG_{CUR}$ is greater than $LOG_{MAX}$, a variable ROI is assigned the value of C (step 330) and the variable $LOG_{MAX}$ is assigned the value of $LOG_{CUR}$ (step 332). Because a region of interest has been found, the value of ROI_found is set to TRUE (step 333). Steps 316-333 are repeated for the remaining regions C in the thumbnail 222 (step 334).

Upon completion of the loop, the method 132 determines whether the value of ROI_found is equal to TRUE (step 336). If it is, the method 132 terminates. Otherwise, a region of interest has not been found, and the method 132 sets the variable ROI to encompass the entire input image 202 (step 338).

Upon completion of the method 132, the value of the variable ROI identifies a region in the image 202 that satisfies both conditions (1) and (2), if such a region exists, and that may therefore be used as the region of interest 242.

Figure 4:
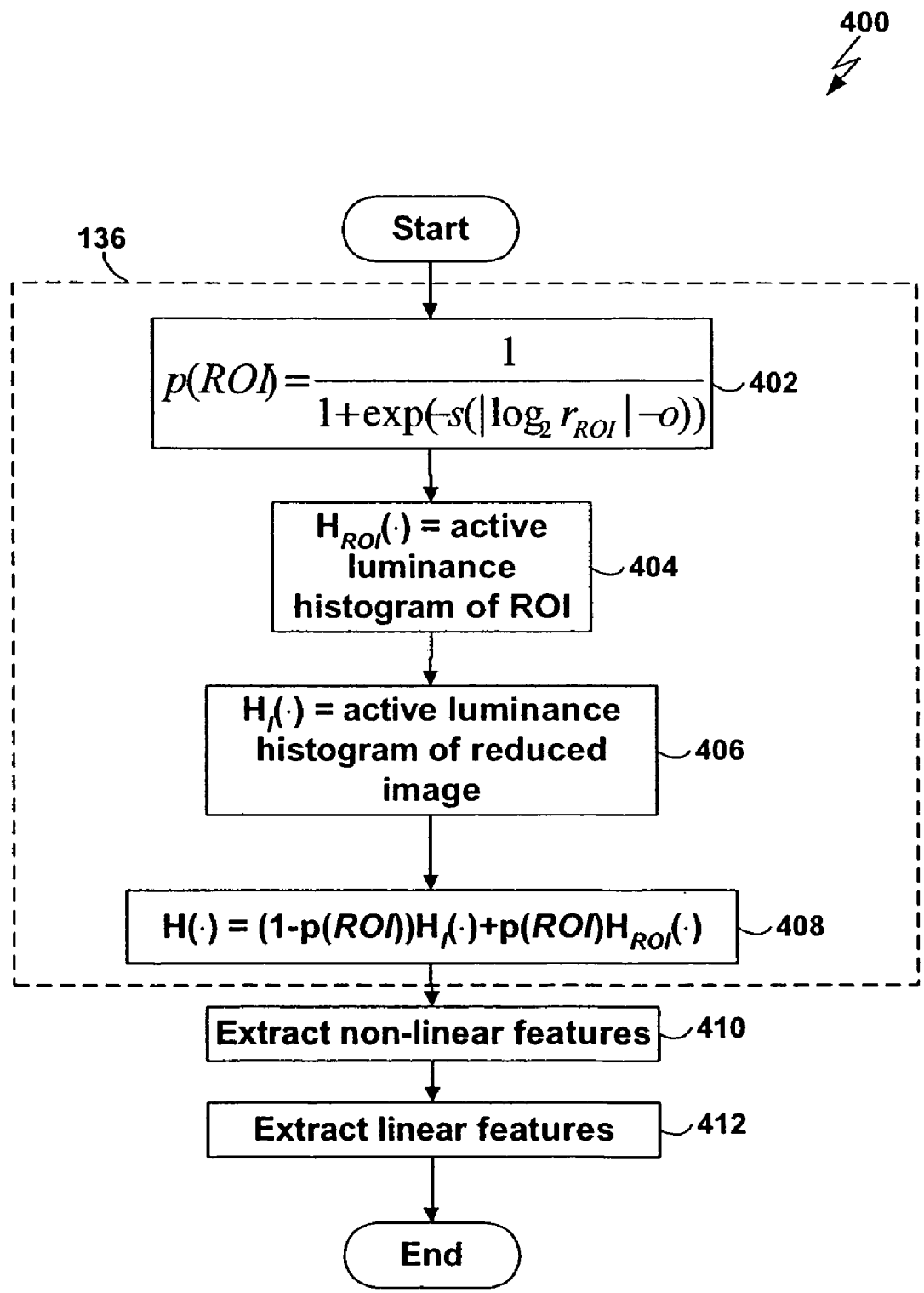
FIG. 4 is a flowchart of a method for extracting features from an image according to one embodiment of the present invention.

Referring to FIG. 4, a flowchart is shown of a method that may be used to extract additional features from the active ROI histogram 246 and the active histogram 244. By way of background, associated with the region of interest 242 may be a likelihood number that denotes the probability that the region of interest 242 influences the desired exposure of the image 202. Let $r_{ROI}$ be the ratio of the average ROI linear luminance to the average linear luminance of the remaining image (i.e., $L_C/L_I$, where C=ROI). Then the likelihood associated with the region of interest 242 is given by Equation 1 (FIG. 4, step 402):

$$p(ROI) = \frac{1}{1 + \exp(-s(|\log_2 r_{ROI}| - o))},\quad \text{Equation 1}$$

where s and o are adjustable parameters. The parameter o represents the luminance difference in stops between the region of interest 242 and the remaining image when the likelihood associated with the region of interest 242 is 0.5. The parameter s is proportional to the slope of the likelihood function at $|\log_2 r_{ROI}|=o$. Since $p(ROI) \to 1.0$ as $|\log_2 r_{ROI}| \to \infty$, it follows that a large difference between the average linear luminance of the region of interest 242 and the rest of the linear luminance channel 224 implies a higher likelihood of the region of interest 242 influencing the final exposure of the image 202 and vice versa. Techniques will now be described for determining how the ROI likelihood p(ROI) weights the ROI contribution towards the final vector of feature values 208.

Let $H_{ROI}(\bullet)$ denote the active ROI luminance histogram 246 (FIG. 4, step 404). Let $H_I(\bullet)$ denote the active luminance histogram 244 (step 406). Then the overall average histogram $H(\bullet)$ 248 is given by Equation 2 (step 408):

$$H(\bullet) = (1-p(ROI))H_I(\bullet) + p(ROI)H_{ROI}(\bullet) \quad \text{Equation 2}$$

The histogram $H(\bullet)$ 248 is an example of a feature that may be extracted in step 106. However, the dimensionality of the feature space may be further reduced by extracting several linear and non-linear features from the histogram $H(\bullet)$ 248 (steps 410 and 412). Such features are examples of features that may be extracted in step 106. Examples of non-linear features that may be extracted include the different percentiles of the histogram $H(\bullet)$ 248. Examples of linear features that may be extracted include the different moments of the histogram $H(\bullet)$ 248.

As mentioned above, the predictor 216 may be generated (step 108) based on ground truth data 210 for the set of ground truth images 522. In one embodiment of the present invention, the predictor 216 is a linear predictor.

Let N be total number of feature values 208 and let $f_i$ denote the $i^{th}$ feature value in the feature values vector 208. Let $x_i$ denote the coefficients 526 (FIG. 6) of the predictor 216. Then the exposure shift prediction $\Delta\hat{e}$ 212 may be generated in step 110 as shown in Equation 3:

$$\Delta\hat{e} = \sum_{i=0}^{N-1} x_i f_i = x^T f, ,\quad \text{Equation 3}$$

where f is the feature value vector 208 and x is the coefficient vector 526.

Figure 5:
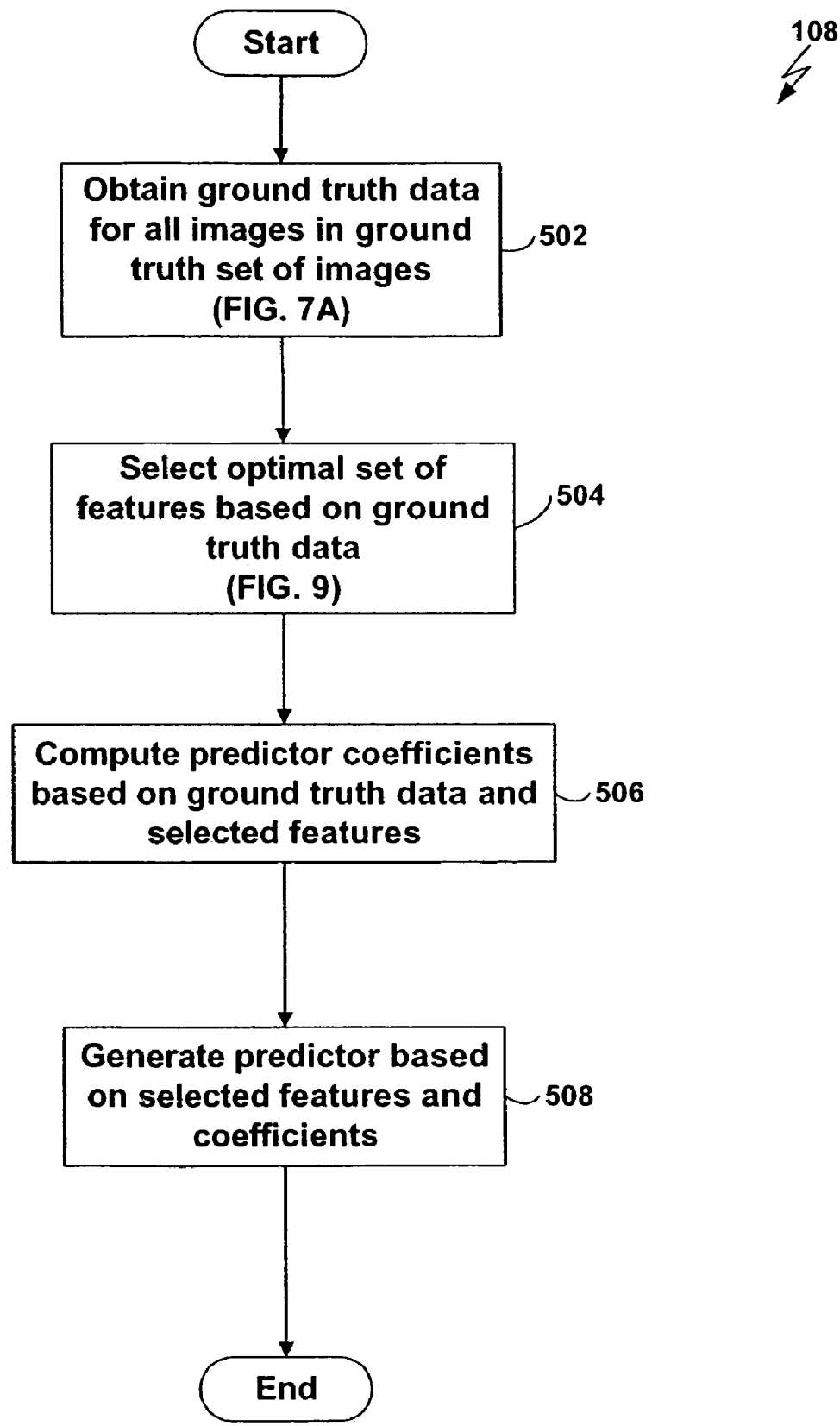
FIG. 5 is a flowchart of a method for generating a predictor for predicting desired image exposures according to one embodiment of the present invention.
Figure 6:
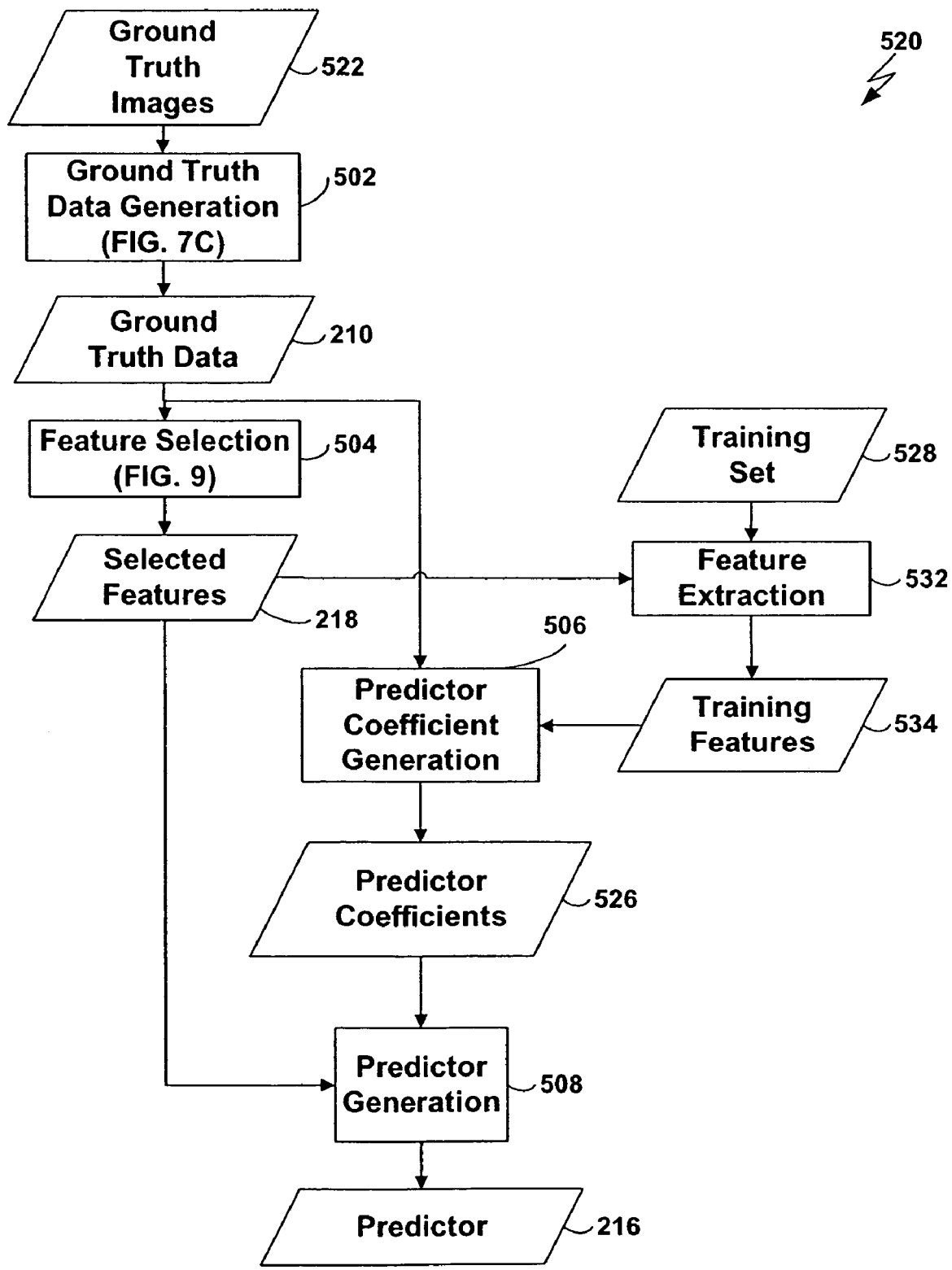
FIG. 6 is a dataflow diagram illustrating the operations performed by the method shown in FIG. 5.

Referring to FIG. 5, a flowchart is shown of a method 500 for generating the predictor 216 (step 108) according to one embodiment of the present invention. Referring to FIG. 6, a dataflow diagram 520 is shown illustrating the operations performed by the method 108 shown in FIG. 5. The method 108 obtains ground truth data 210 for all images in a set of ground truth images 522 (step 502). Examples of techniques for obtaining the ground truth data 210 will be described below with respect to FIG. 7B. The method 108 selects the optimal set of features 218 based on the ground truth data 210 (step 504). Examples of techniques for selecting the feature set 218 will be described below with respect to FIG. 9. The method 108 computes coefficients 526 for the predictor 216 based on the ground truth data 210 and the selected features 218 (step 506). Referring to FIG. 6, step 506 may be performed, for example, by extracting 532 a set of training features 534 from a set of training images 528 based on the selected features 218, and by generating the predictor coefficients (step 506) based on the ground truth data 210 and the training features 534. The training set 528 may be any set of images that is used to train the predictor 216 and is a subset of the ground truth set 522. The method 108 generates the predictor 216 based on the selected features 218 and the selected coefficients 526 (step 508).

Figure 7A:
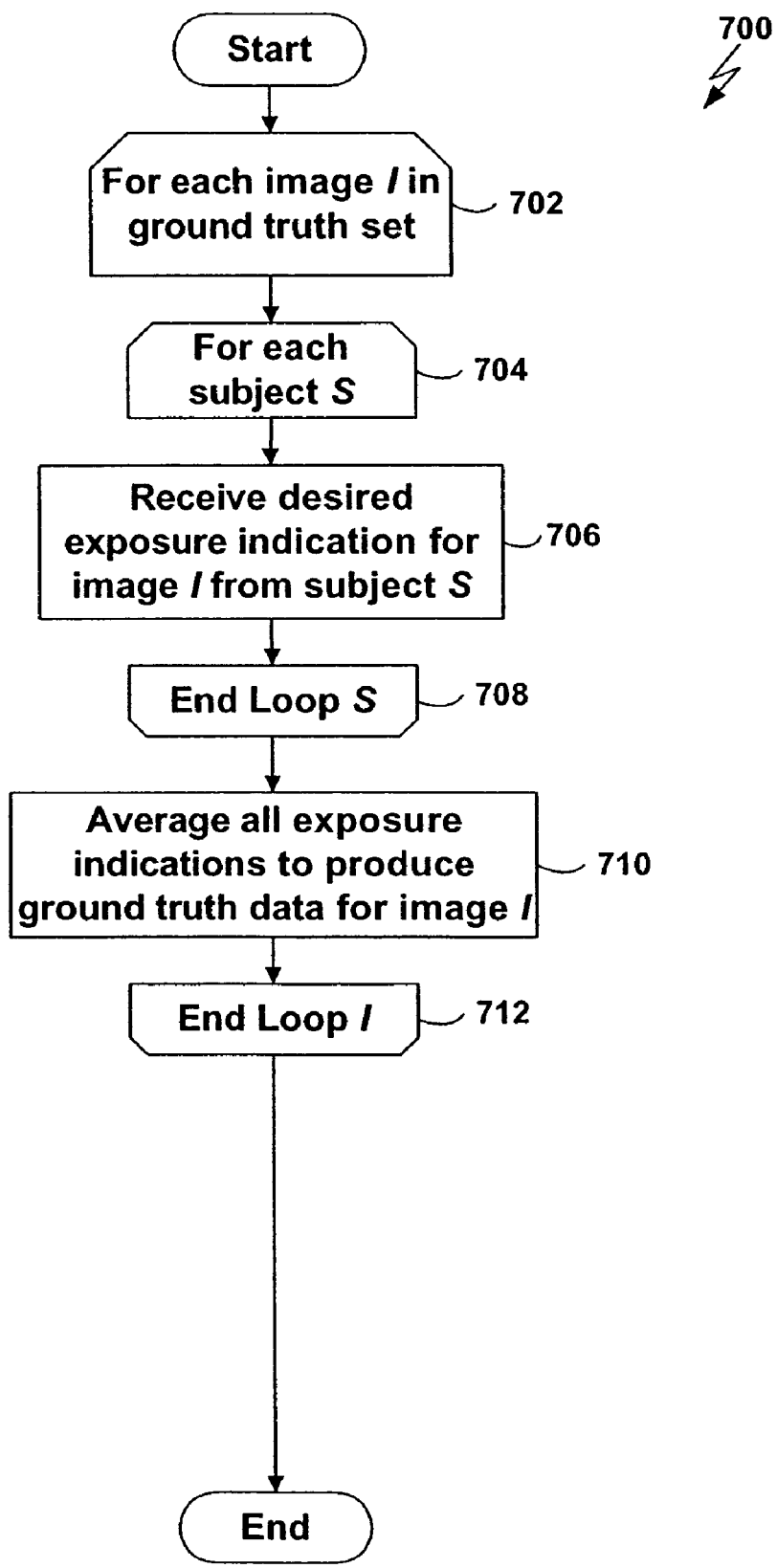
FIG. 7A is a flowchart of a method for generating ground truth data for a set of ground truth images according to one embodiment of the present invention.
Figure 7B:
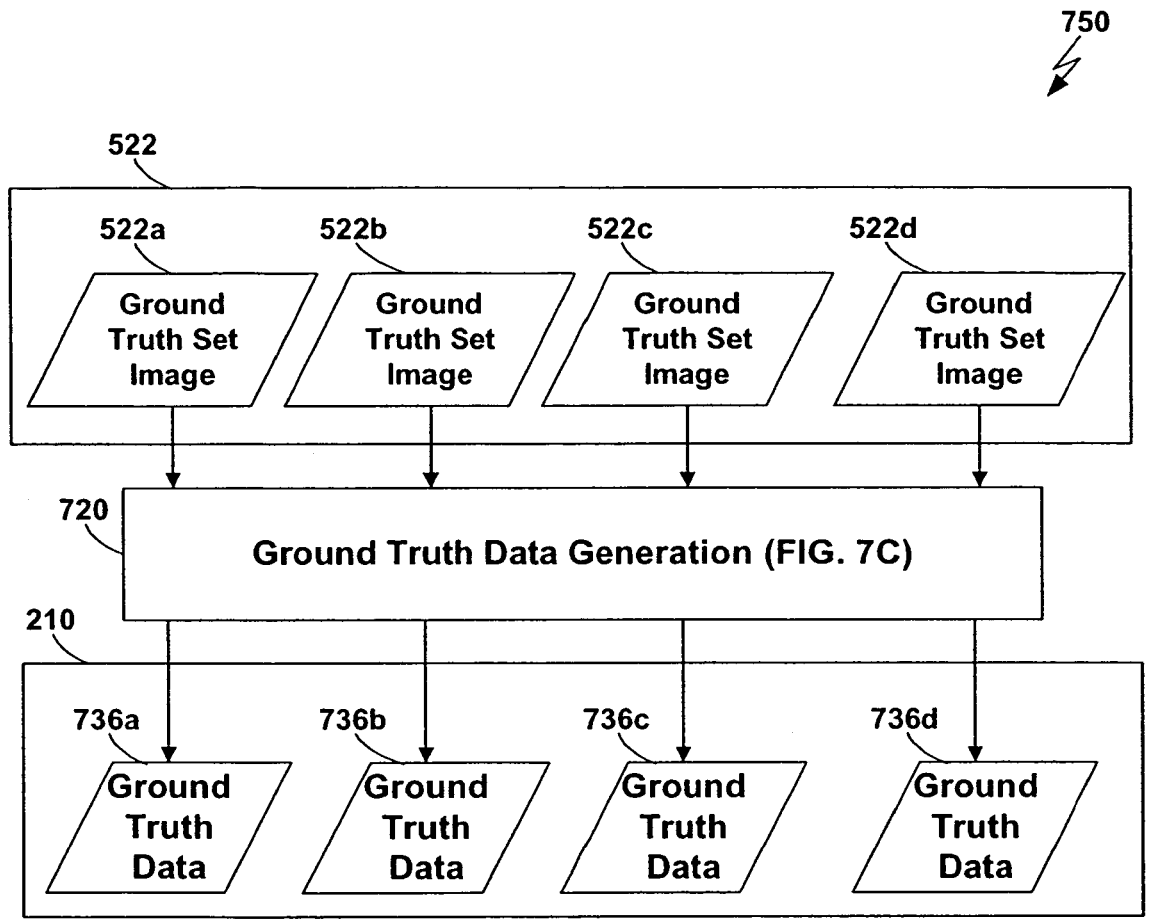
FIG. 7B is a dataflow diagram illustrating the operations performed by the method of FIG. 7A according to one embodiment of the present invention.

The method 108 shown in FIG. 5 will now be described in more detail. Referring to FIG. 7A, a flowchart is shown of a method 700 that may be used to generate the ground truth data 210 (FIG. 5, step 502). Referring to FIG. 7B, a dataflow diagram 750 is shown which illustrates the operations performed by the method 700 shown in FIG. 7A.

The ground truth data 210 may be acquired by conducting a psychophysical scaling test in which human subjects are asked to determine the best exposure for each of the images 522a-d in the ground truth set 522. Although only four images 522a-d are shown in FIG. 7B, in practice there may be a much larger number of ground truth images.

Figure 7C:
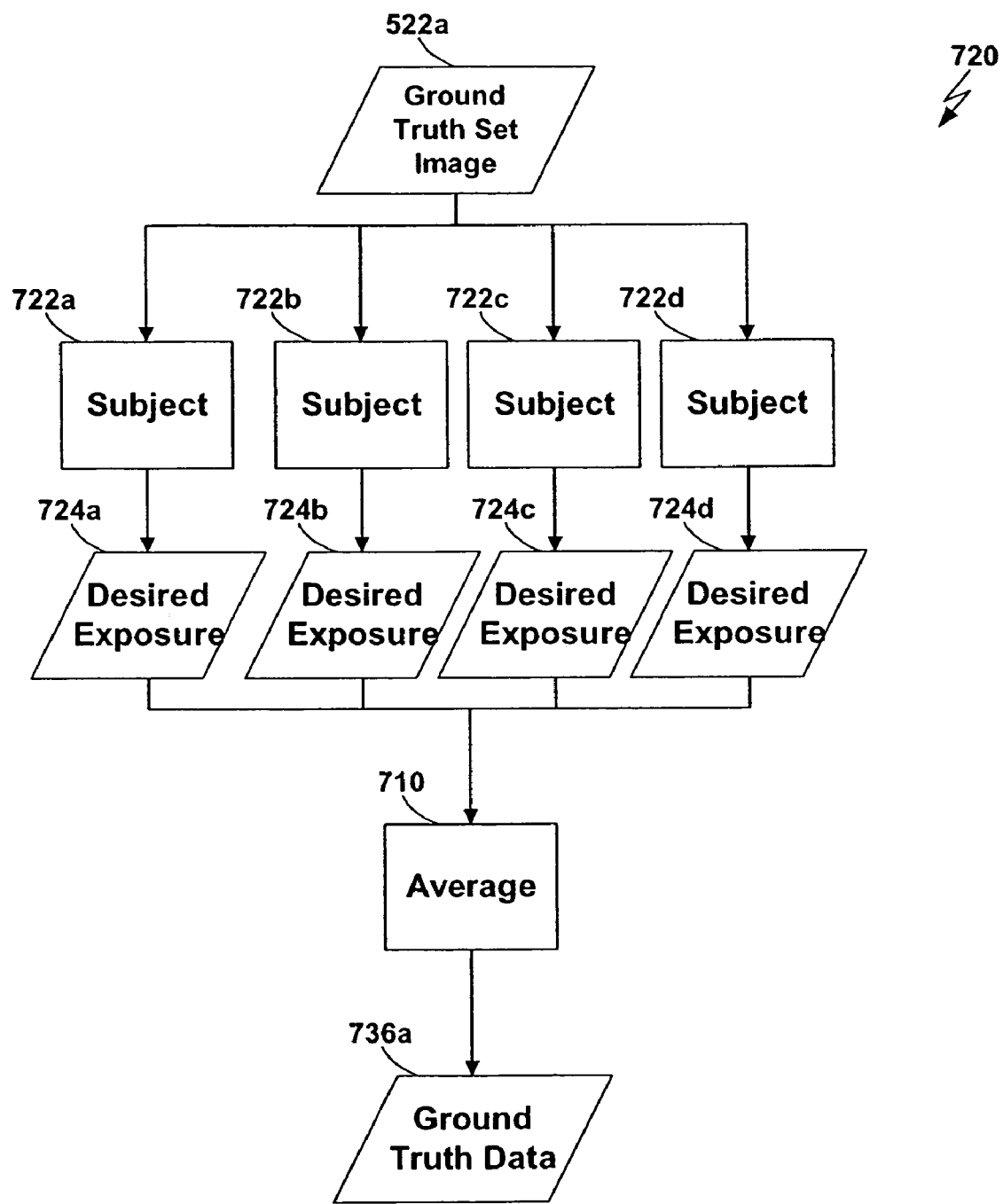
FIG. 7C is a dataflow diagram illustrating the generation of ground truth data for an image in a ground truth set of images according to one embodiment of the present invention.

The method 700 may enter a loop over each image I in the ground truth set 210 (step 702). Referring to FIG. 7C, a dataflow diagram 720 is shown illustrating, by way of example, the generation of ground truth data 736a for a single image 522a in the ground truth set 522. For each human subject S in a plurality of human subjects 722a-d (step 704), the method 700 receives an indication from the subject of the desired exposure for image I (step 706). For example, referring to FIG. 10, a graph 1000 is shown of a family of exposure adjustment curves, the particular characteristics of which are described in more detail below. Each such curve may be applied to an image to perform a particular exposure correction on the image.

In one embodiment of the present invention, each of the exposure adjustment curves shown in the graph 1000 is applied to the image I, and the resulting exposure adjusted images are displayed to the subject S. Associated with each of the exposure adjustment curves is a single number $\Delta e_i$ reflecting the particular exposure adjustment associated with the curve. The subject S selects a particular one of the exposure-adjusted images that the subject believes has the best exposure among all of the exposure adjusted images. The exposure correction $\Delta e_i$ associated with the exposure adjustment curve corresponding to the image selected by the subject S is provided as the desired exposure indication in step 706.

For example, as shown in FIG. 7C, subject 722a indicates desired exposure 724a by selecting a particular one of the exposure-adjusted images as having the best exposure. The method 700 similarly receives desired exposure indications from the remaining subjects (step 708). For example, as shown in FIG. 7C, subject 722b indicates desired exposure 724b, subject 722c indicates desired exposure 724c, and subject 722d indicates desired exposure 724d.

The method 700 averages all of the exposure indications received in the loop in steps 704-708 to produce a single exposure correction number $\Delta e$, referred to as the "ground truth data" for image I (step 710). For example, as shown in FIG. 7C, ground truth data 736a is produced for image 522a. The inverse of the variance of the desired exposures 724a-d indicated by the subjects 722a-d may be used to weight the mean-square error in the design of the predictor 216. This allows the influence of any image in the determination of the prediction weights to be reduced when the subjects differed significantly in their opinions regarding the best exposure of image I.

The method 700 generates ground truth data for the remaining images in the ground truth set 522 using the same techniques (step 712). For example, as shown in FIG. 7B, ground truth data 736b may be generated for training set image 522b, ground truth data 736c may be generated for ground truth set image 522c, and ground truth data 736d may be generated for ground truth set image 522d.

Before describing how feature selection (step 504) may be performed, techniques will be described for generating the predictor coefficients 526 given a particular set of features. For example, let e denote the column vector containing the ground truth data 210 for all of the images 522a-d in the ground truth set 522. Let the feature vectors of each of the images 522a-d of the ground truth set 522 form the rows of a matrix F. Then the predictor coefficients x 526 may be generated (step 506) using Equation 4:

$$x=(F^T F)^{-1} F^T e,\quad \text{Equation 4}$$

Alternatively, if W is a diagonal weight matrix computed using the inverse variance of the ground truth data 210, the coefficients x 526 may be generated (step 506) using Equation 5:

$$x=(F^T W F)^{-1} F^T W e.\quad \text{Equation 5}$$

In either case, once the number and type of features are determined (FIG. 9), the coefficients x 526 may be generated using the closed form expressions in Equation 4 or Equation 5. The remaining problem is to determine which features to select as the selected features 218.

Figure 7D:
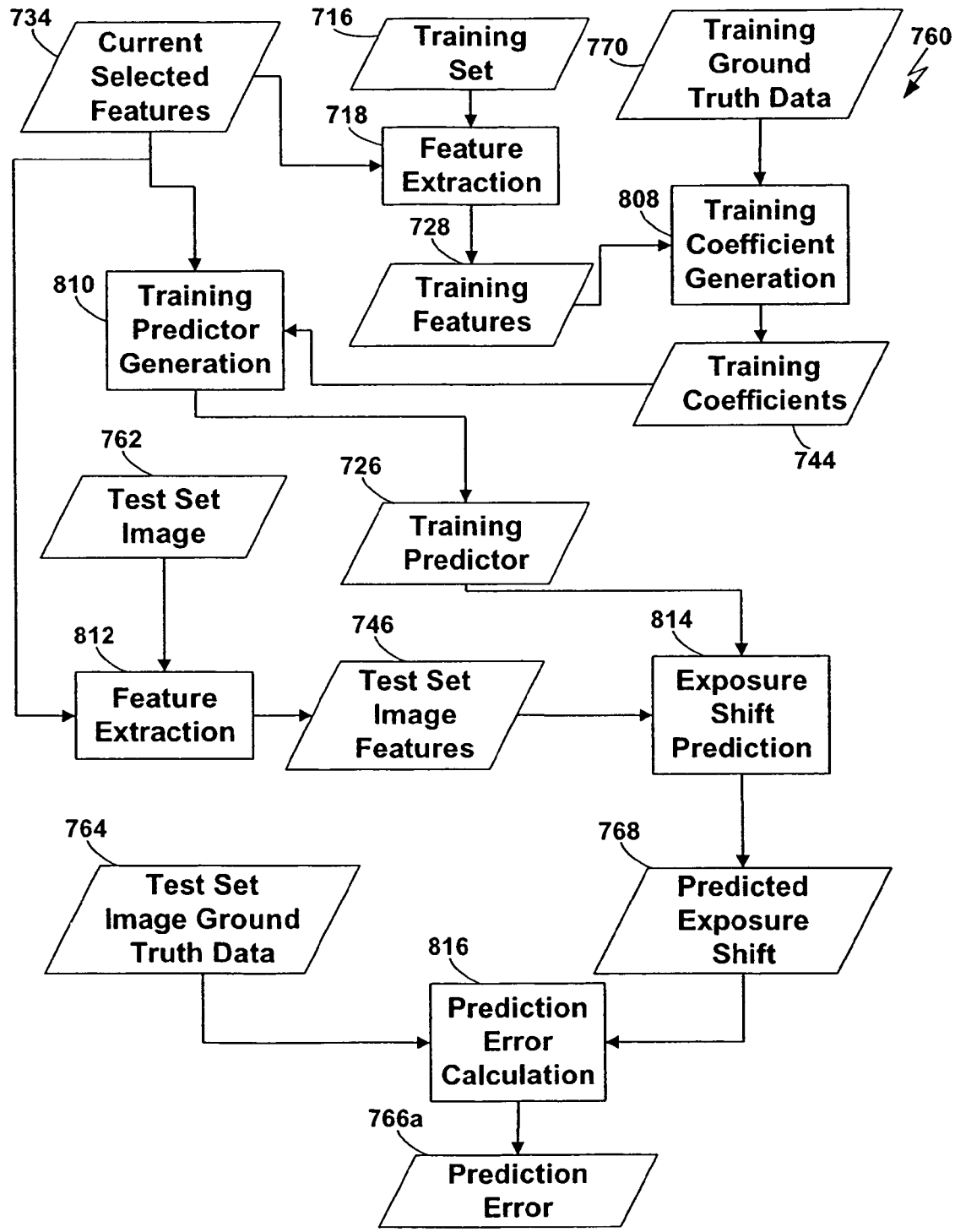
FIG. 7D is a dataflow diagram illustrating the computation of a prediction error for a test set image according to one embodiment of the present invention.

Examples of techniques will now be described for determining which and how many features are optimal for inclusion in the set of selected features 218. In one embodiment of the present invention, the set of ground truth images 522 is divided into two subsets: a training set (such as training set 716 shown in FIG. 7D) and a test set (not shown). The training set is used to design a training predictor 726 (FIG. 7D). The test set is used to test the predictor 726 and to compute the prediction error.

Figure 8:
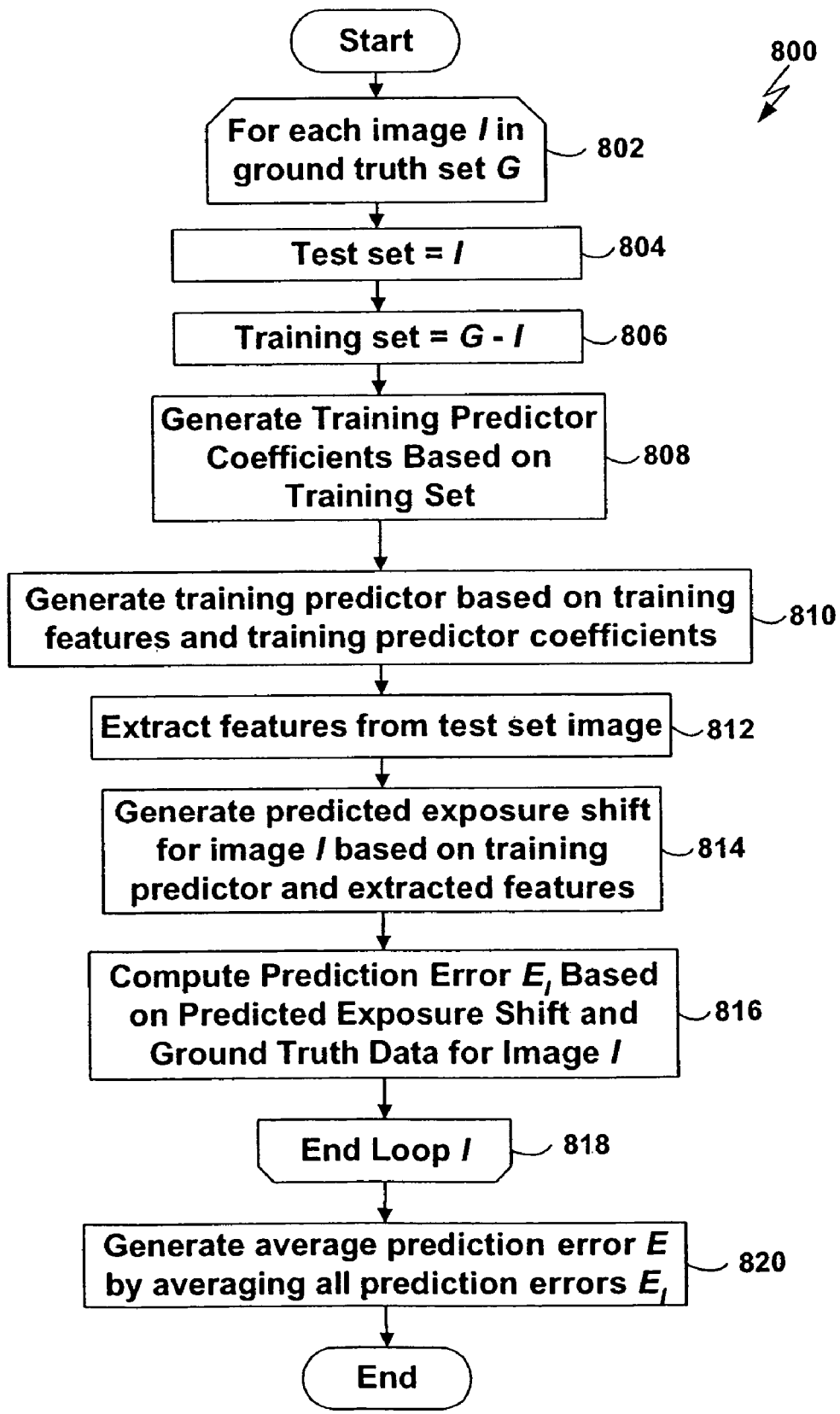
FIG. 8 is a flowchart of a method for computing the average prediction error for a plurality of images in a ground truth image set according to one embodiment of the present invention.

In practice, the number of ground truth images in the ground truth set 522 is limited. Dividing the images in the ground truth set 522 into subsets further limits the number of design or test samples, thereby potentially reducing the quality of the predictor 216. Referring to FIG. 8, a flowchart is shown of a method 800 that may be used to address this problem.

In general, the method 800 uses a leave-n-out approach which cycles through the entire ground truth image set 522, n images at a time. In the particular method 800 shown in FIG. 8, n=1. In each cycle, only one image from the ground truth set 522 is chosen for the test set and the rest of the images from the ground truth set 522 are used to design the predictor 726. The prediction error is then computed on the single image in the test set. The entire procedure is repeated for the next image in the ground truth set 522 and so on. The advantage of this method is that all images but one are used to design the predictor 726 and all images are used to test the predictor 726. This minimizes the bias in the design and test error of the predictor 726. However, the downside of this procedure is that the design procedure has to be repeated as many times as the number of images in the ground truth set 522.

The procedure described generally above will now be described in more detail. Referring to FIG. 8, a loop is entered over each image I in the ground truth image set G 522 (step 802). The single image I is placed into the test set (step 804), and all of the ground truth images 522a-d except for image I are placed into the training set (step 806).

Referring to FIG. 7D, a dataflow diagram 760 is shown which illustrates the calculation of a prediction error 766a by the method 800 based on the test set image I 762 and the current training set 716. The method 800 generates training predictor coefficients 744 based on the training set (step 808) using, for example, Equation 4 or Equation 5. In particular, the method 800 may extract 718 features 728 from the training set 716 based on a current set of features 734. The method 800 may generate training coefficients 744 based on ground truth data 770 for the training set 716 and the extracted training set features 728.

The method 800 generates a training predictor 726 based on the current set of feature identifiers 734 and the training predictor coefficients 744 (based on the structure of Equation 3) (step 810). The current set of features 734 may be selected as described below with respect to FIG. 9.

The method 800 extracts the current selected features 734 from the test set image I 762 to produce test set image features 746 (step 812). The method 800 uses the training predictor 726 to generate a predicted exposure shift 768 for the test set image 762 based on the extracted features 746 using Equation 3 (step 814). The method 800 calculates a prediction error $E_I$ 766a for the test set image 762 by subtracting the predicted exposure shift 768 from the ground truth data 764 for the test set image I 762 (step 816). Prediction errors are generated in the same manner for the remaining images in the ground truth set G 522 (step 818).

Figure 7E:
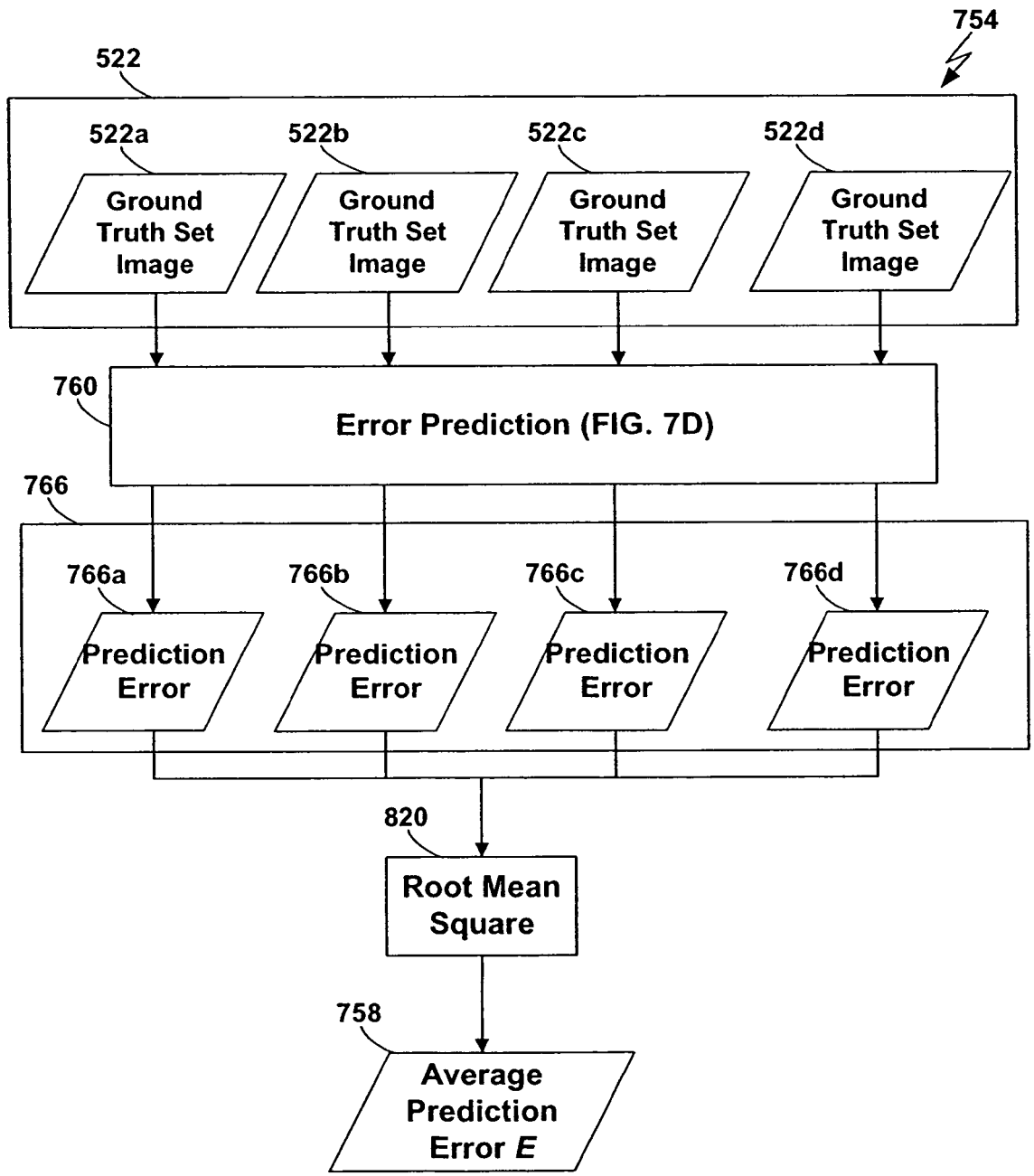
FIG. 7E is a dataflow diagram illustrating the computation of an average prediction error for a plurality of images in a ground truth image set according to one embodiment of the present invention.

Referring to FIG. 7E, for example, a dataflow diagram 754 is shown illustrating the generation of a plurality of prediction errors 766, one for each of the images 522a-d in the ground truth set 522. As each of the ground truth images 522a-d is used as the test set image 762, a corresponding prediction error is generated. For example, prediction error 766a is generated for image 522a, prediction error 766b is generated for image 522b, prediction error 766c is generated for image 522c, and prediction error 766d is generated for image 522d. Once prediction errors $E_I$ 766a-d are generated for each image in the ground truth set 522, the root mean square (RMS) is taken of all of the prediction errors $E_I$ 766a-d to produce an average prediction error E 758 for the ground truth set 522 (step 820). The average prediction error E 758 may be used to select an optimal number and combination of features for use as the selected features 218, as will now be described in more detail.

Figure 9:
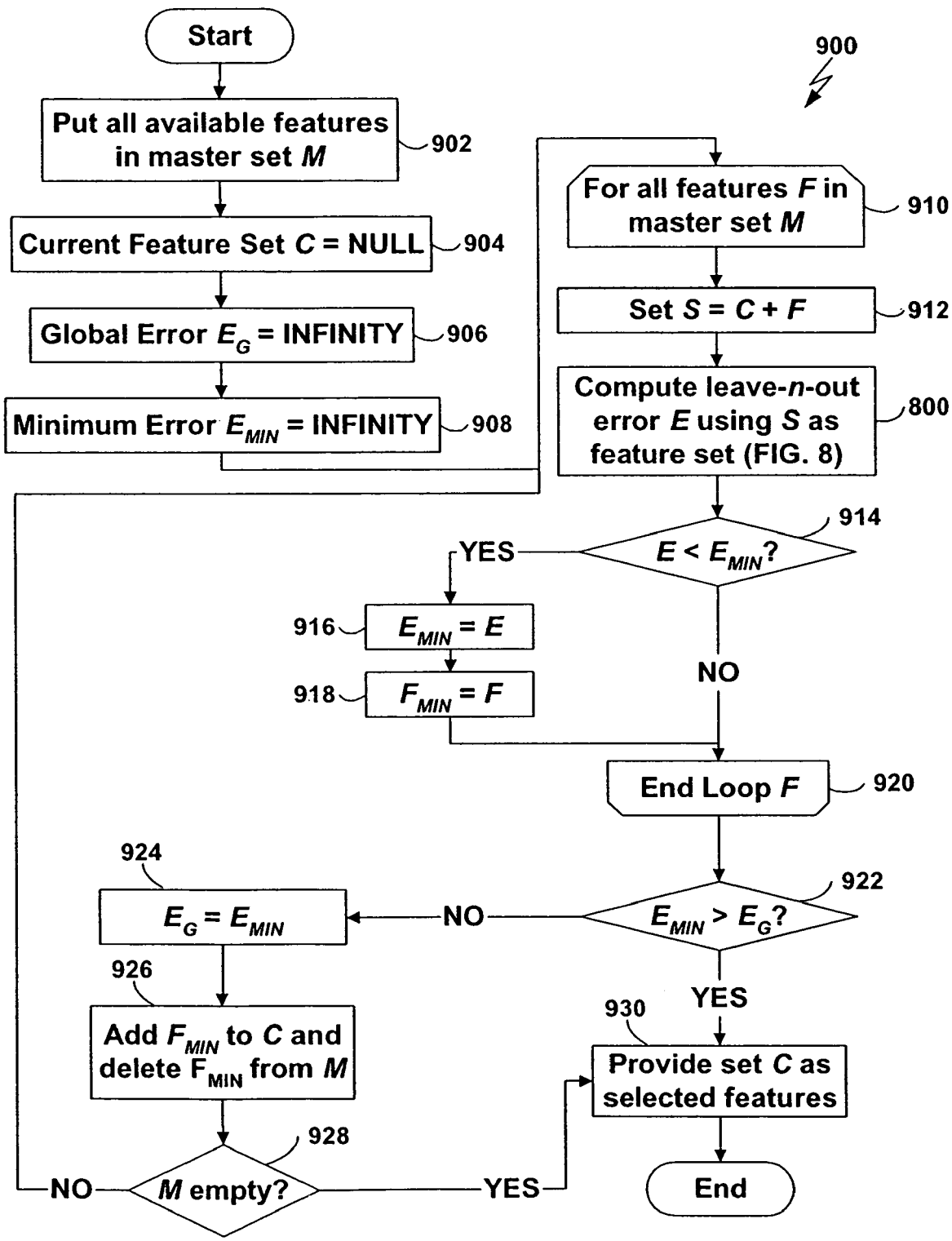
FIG. 9 is a flowchart of a method for selecting an optimal number and combination of features for use in exposure correction according to one embodiment of the present invention.

Referring to FIG. 9, a flowchart is shown of a method 900 that may be used to select an optimal number and combination of features for use as the selected features 218. All available features are placed into a master feature set M (step 902). The master set of features may be selected in any manner. Examples of features that may be placed into the master feature set M include the ROI histogram 246, the active histogram 244, the average histogram 248, and linear and non-linear features extracted from the features just listed. A current feature set C is initialized to a null set (step 904), a global error value $E_G$ is initialized to infinity (step 906), and a minimum error value $E_{MIN}$ is initialized to infinity (step 908).

A loop is entered over each feature F in the master set M (step 910). A set S is formed by adding the feature F to the current feature set C (step 912). The method 800 shown in FIG. 8 is used to compute an average leave-n-out error E for the images 522a-d in the ground truth image set 522 using set S as the set of current selected features 734 (step 800).

If the average error E is less than the minimum error $E_{MIN}$ (step 914), the minimum error $E_{MIN}$ is assigned the value of E (step 916) and a variable $F_{MIN}$ is assigned the value of F (the current feature) (step 918). The loop initiated in step 910 is repeated for each of the features F in the current set C (step 920).

Upon completion of the loop performed in steps 910-920, $E_{MIN}$ contains the minimum leave-n-out prediction error obtained in any iteration of the loop, and $F_{MIN}$ indicates the feature that resulted in the minimum error $E_{MIN}$. The method 900 determines whether the minimum error $E_{MIN}$ is greater than the global error $E_G$ (step 922). If $E_{MIN} > E_G$, the current feature set C is provided as the set of selected features 218. If $E_{MIN} \leq E_G$, then $E_G$ is assigned the value of $E_{MIN}$ (step 924), and the feature $F_{MIN}$ is added to the current feature set C and removed from the master set M (step 926).

The method 900 determines whether the master set M is empty (step 928). If the master set M is not empty, the procedure described above with respect to steps 910-926 is performed again using the updated master set M and current set C. If the master set M is empty, the current feature set C is provided as the set of selected features 218.

In summary, the method 900 identifies the single best feature that results in the minimum average prediction error in the first iteration of the loop initiated in step 910. In the second iteration of the loop, the method 900 identifies the next best feature that in combination with the first feature achieves the minimum error. The method 900 continues in this fashion until the minimum average prediction error $E_{MIN}$ eventually starts to increase with the addition of more features. At this point the method 900 terminates. The features that are in the current set C upon termination of the method 900 represent a set of optimal features that may be provided as the selected features 218.

As described above with respect to FIG. 5 and FIG. 6, once the selected features 218 are selected (FIG. 9), the predictor coefficients 526 may be generated based on the ground truth data 210 and feature identifiers 218 using, for example, Equation 4 or Equation 5 (step 506), and the predictor 216 may be generated based on the features 218 and the coefficients 526 using, for example, the structure of Equation 3 (step 508).

Note that if the entire ground truth set 522 were used to design and test the predictor 216, the minimum error $E_{MIN}$ would always decrease upon the addition of a new feature to the current set C. In fact, if there are m images in the ground truth set 522, the minimum error $E_{MIN}$ be made to be exactly zero by choosing m independent features. This follows from the fact that the column space of F spans the ground truth vector e. In such a case, the predictor that is generated may not be optimal. Rather, the predictor that is generated may merely predict the m images in the ground truth set 522 perfectly, while the performance for other images may not be specified. In practice, a predictor designed in this fashion may perform poorly in the field because it may not generalize its prediction well enough for images outside the ground truth set. By testing with a set that is independent of the training set, we ensure that only those features that generalize well for other images are included in the final feature set 218 and features that just fit the noise are excluded.

Having described how to generate the predictor 216, techniques will now be disclosed for changing (correcting) the exposure of the image 202 to the desired value (step 112). An algorithm that causes an exposure change should not alter the color balance of the image in the process. This may be achieved by operating solely on the luminance channel of the image in a luminance/chrominance space. Alternatively, if the exposure correction algorithm operates in the RGB space, the same transformation should be applied to all of the channels so as not to alter the color balance of the image. Techniques using the latter approach will now be described because it is desirable to transform the image such that at least one of its channels occupies the entire gray scale, and it is particularly easy to do this in the RGB space.

Figure 11:
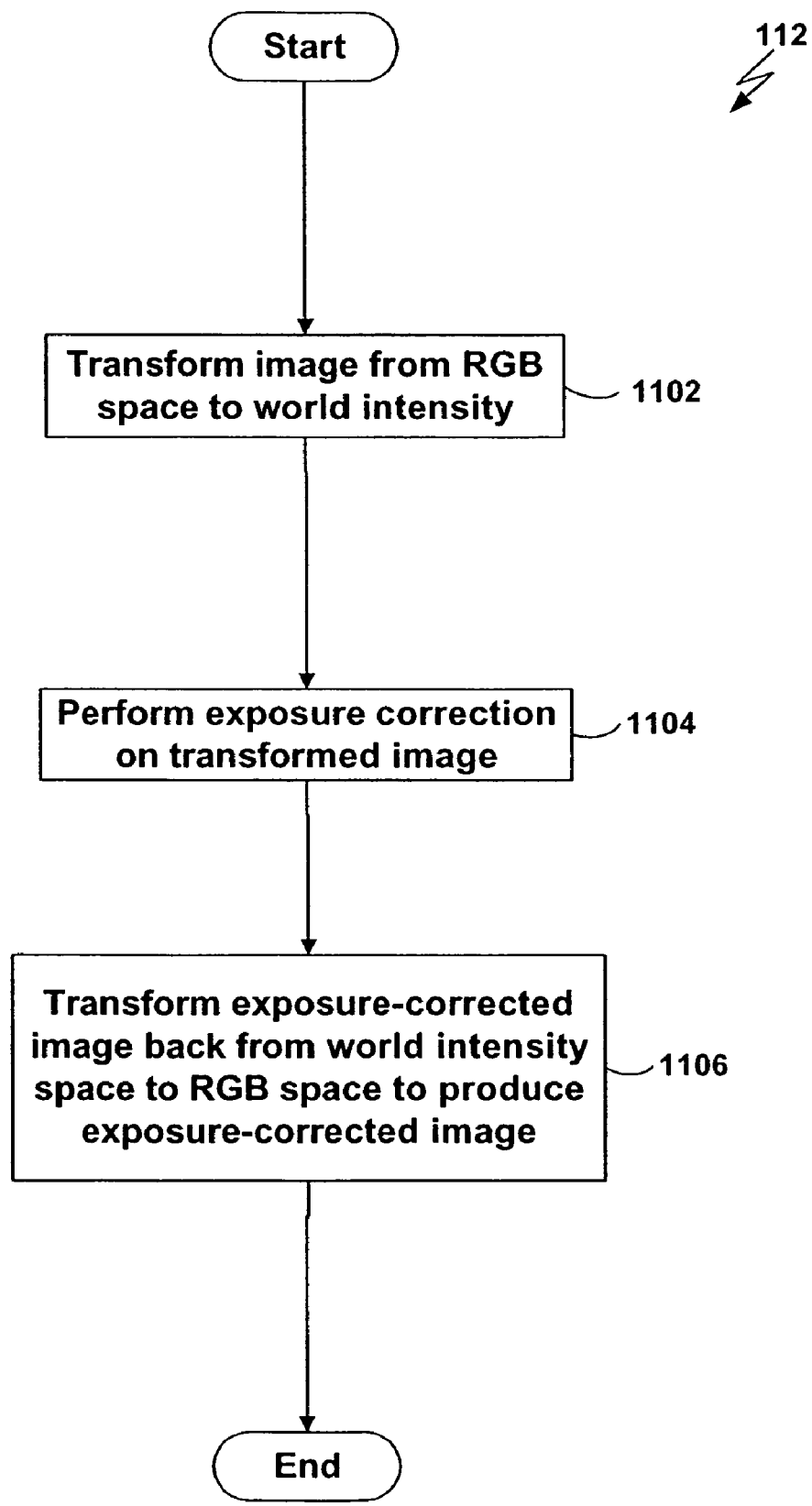
FIG. 11 is a flowchart of a method for applying an exposure correction to an image to produce an exposure-corrected image according to one embodiment of the present invention.

Once the predictor 216 is generated, the predicted exposure offset 212 for the image 202 may be generated based on the extracted feature values 208 using Equation 3 (step 110). Referring to FIG. 11, a flowchart is shown of a method for applying the exposure offset 212 to the input image 202 to produce the exposure-corrected image 214 (step 112) according to one embodiment of the present invention. The method 112 transforms the input image 202 from RGB space back to intensities in the original scene (i.e., the world intensity space) (step 1102). The method 112 performs exposure correction on the transformed image (step 1104). The method 1100 transforms the exposure-corrected image back from world intensity space to RGB space to produce the exposure-corrected image 214 (step 1106).

In one embodiment of the present invention, the forward transformation from the world log intensity space to the RGB space (step 1106) is modeled by an S-shaped curve that serves to compress the tones in the highlight and the shadow regions. This is followed by a gamma function designed to model the inverse response of a typical monitor. The combination of the S-shaped tone reproduction curve and gamma forms a complete forward transformation represented herein as T(•).

Let i denote the world log intensity. Then T(i) is defined by Equation 6:

$$T(i) = (A + B \tan h(-s(i+o)))^{1/\gamma}, \quad \text{Equation 6}$$

where A, B, s and o are parameters of the S-shaped tone reproduction curve and γ is the monitor gamma. It should be appreciated that the parameters s and o in Equation 6 are not the same as the parameters s and o in Equation 1.

Figure 10:
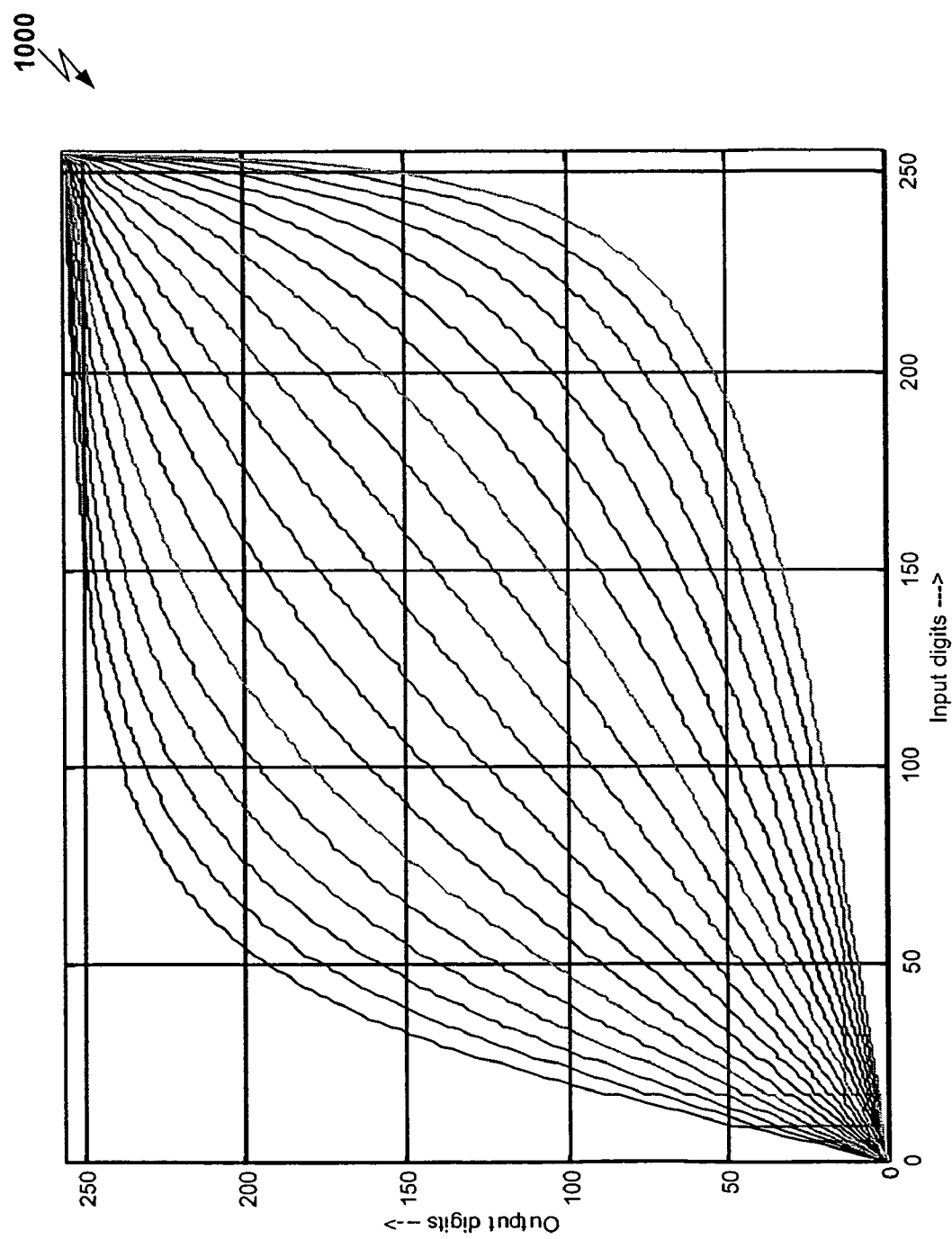
FIG. 10 is a graph illustrating a family of exposure adjustment curves for use in exposure correction according to one embodiment of the present invention.

The reverse transformation from RGB space to log world intensity space (step 1102) for a particular gray level g in RGB space may therefore be represented as $T^{-1}(g)$. The exposure correction of gray level g by a desired exposure offset Δe (measured in stops) in world intensity space (steps 1102 and 1104) may therefore be represented by $T^{-1}(g) + \Delta e$. The complete exposure correction of an RGB-space gray level g, including reverse and forward transformations, performed by the exposure correction method 1100 illustrated in FIG. 11, may therefore be represented by Equation 7:

$$g' = T(T^{-1}(g) + \Delta e), \quad \text{Equation 7}$$

where g' is the exposure-corrected gray level in RGB space. The graph 1000 in FIG. 10 illustrates a family of curves, each of which corresponds to a different value of Δe.

Once the predicted exposure offset Δe 212 is generated, the result of Equation 7 may be calculated for all gray levels, and pairs of gray levels and corresponding corrected gray levels may be stored in a lookup table (LUT). Exposure correction may thereafter be performed on each channel of an image using the lookup table rather than by calculating the results of Equation 7 for each pixel or gray level in the image, thereby significantly increasing the speed with which exposure correction may be performed.

One advantage of the techniques just described is that they perform exposure correction based on a model that models a mapping from world intensity space to the intensity space (e.g., RGB space) of the captured image 202. As described above, the model includes a gamma function that models the response of a typical monitor and an S-shaped curve that compresses the large dynamic range of the world to the small dynamic range of the image capture (e.g., RGB) space. Using such a model enables the exposure of the image 202 to be corrected by employing the inverse of the model to transform the image to logarithmic intensities in the world, adding or subtracting an offset (given by the desired exposure correction) from the image, and then mapping the image back to the RGB digit space using the above model. One advantage of using such a model is that it enables exposure corrections to be applied in the world intensity space, where such corrections are more likely to have their intended effect across the full range of intensities, assuming that the model reasonably reflects the transfer function that was used to capture the image 202.

Figure 12:
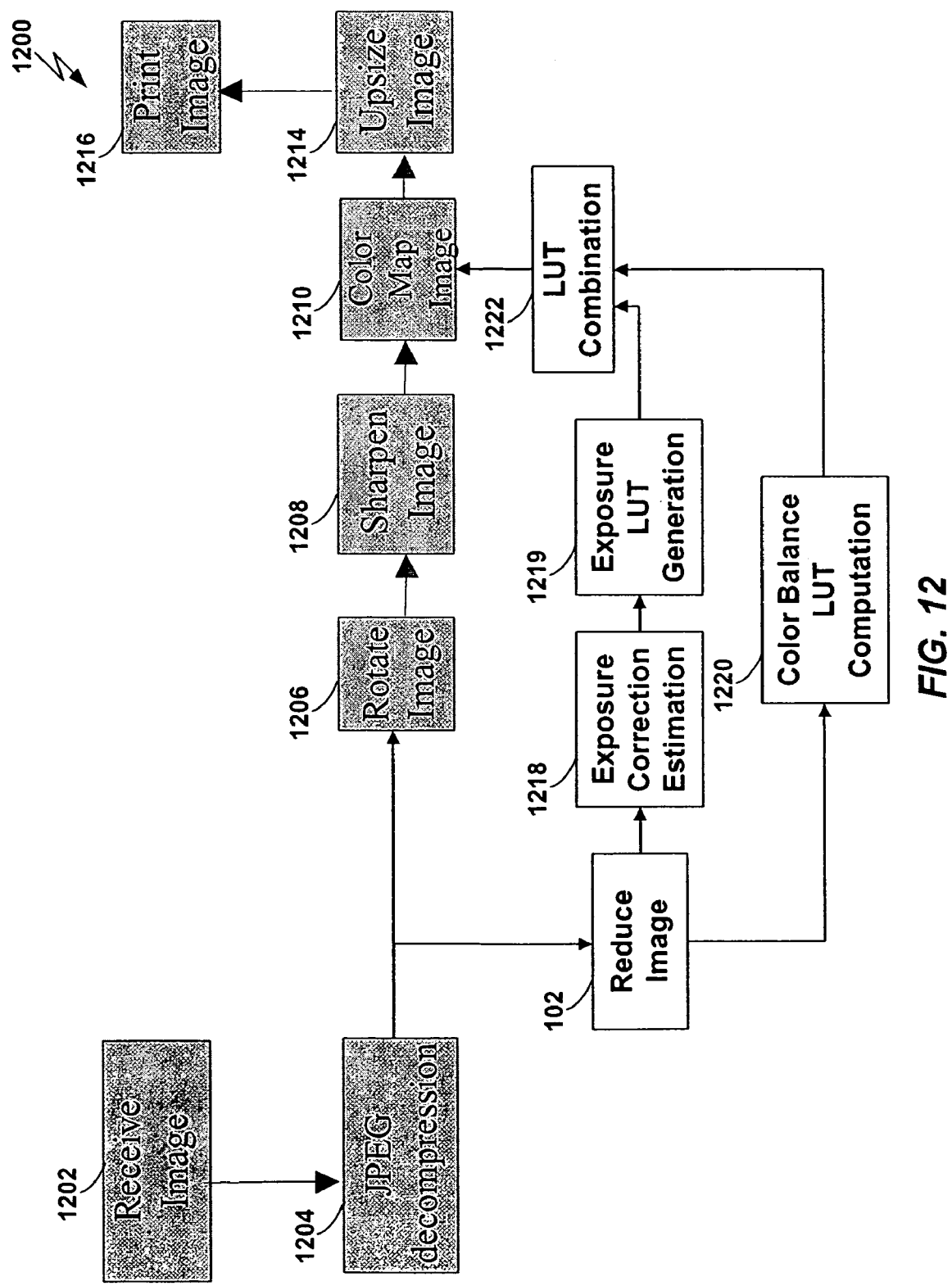
FIG. 12 is a flowchart of a method in which color mapping and exposure correction are integrated according to one embodiment of the present invention.

Embodiments of the present invention may be integrated with the color mapping process that is typically performed on digital images when output to a rendering device such as a printer. For example, referring to FIG. 12, a flowchart is shown of a method 1200 in which color mapping and exposure correction are integrated according to one embodiment of the present invention. The method 1200 receives an image from a source such as a digital camera (step 1202) and performs JPEG decompression on the image (step 1204). The method 1200 reduces the image using the techniques described above with respect to FIGS. 1B and 2B (step 102). The method 1200 then performs automatic color balancing and automatic exposure correction on the image using an integrated process. Color balancing, for example, is often performed in the RGB space using three one-dimensional lookup tables. Such lookup tables may be combined with the exposure correction lookup tables described above to generate three one-dimensional lookup tables that perform both color balancing and exposure correction with a single set of one-dimensional lookups.

For example, exposure correction estimation may be performed (step 1218) using the techniques disclosed herein to generate three one-dimensional exposure correction lookup tables (step 1219). Three one-dimensional color-balancing lookup tables may also be computed (step 1220) and combined with the exposure correction lookup tables generated in step 1219 (step 1222). The method 1200 may perform any of a variety of) image processing steps on the decompressed image, such as rotating the image (step 1206) and sharpening the image (step 1208). These particular image processing steps are shown merely for purposes of example and do not constitute limitations of the present invention.

The method 1200 performs color mapping on the image (step 1210). Color mapping often involves several operations, including a one-dimensional pre-lookup table, a three-dimensional matrix or three-dimensional lookup, and a one-dimensional post-lookup table. Exposure correction may be integrated into the one-dimensional pre-lookup table operation of color mapping using the single set of three one-dimensional lookup tables (generated in step 1222) that perform the combined function of exposure correction, color balance, and the one-dimensional pre-lookup table portion of color mapping.

The method prepares the image for printing (or other output) by upsizing the image (step 1214). The method 1200 then prints the image (step 1216). It should be appreciated that various steps in the method 1200 (such as steps 1204, 1206, 1208, 1214, and 1216) are provided merely as examples of steps that may be performed in conjunction with processing of the input image 202 and do not constitute limitations of the present invention.

One advantage of the techniques disclosed herein is that they may operate in the RGB space, thereby making them susceptible to being integrated with color mapping as just described. Integrating exposure correction with color mapping reduces the number of steps that are required to optimize an image for printing and may therefore make it possible to perform such processing more quickly than other methods which correct image exposure in a luminance-chrominance space or other non-linear space.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method for processing an image, the method comprising:

determining an absolute logarithm of an average luminance ratio for each region of a plurality of predetermined regions within the image, wherein the average luminance ratio of a region comprises a ratio of the average luminance of the region to an average luminance of the image excluding the region;

identifying a region, from among the plurality of predetermined regions, with the highest absolute logarithm of the average luminance ratio of the region, the region with the highest absolute logarithm of the average luminance ratio being an active region of interest;

extracting, from the image, values of at least one feature derived from the active region of interest in the image;

predicting a desired exposure correction of the image based on the extracted values; and correcting, via a processor, the exposure of the image by the predicted exposure correction to produce an exposure-corrected image;

wherein the active region of interest has a base size that is proportional to the dimensions of the image, wherein the dimensions of the active region of interest are proportional to the base size multiplied by a measure of average activity in the image, and wherein the average activity is based, at least in part, on luminance within the image.

2. The method of claim 1, wherein the active region comprises a plurality of pixels satisfying an activity threshold.

3. The method of claim 2, wherein an average activity within the active region is above a predetermined minimum activity threshold.

4. The method of claim 1, wherein the extracted feature values are based on values of a luminance channel of the image.

5. A method for processing an image, the method comprising:
  extracting, from the image, values of at least one feature derived from an active region of interest in the image, wherein the extracting comprises:
    identifying the active region of interest in the image,
    screening the image for activity to generate an active image,
    generating an average histogram as a weighted average of a histogram of the active region of interest and a histogram of the active image, and
    extracting values of features from the average histogram;
  predicting a desired exposure correction of the image based on the extracted values; and
  correcting, via a processor, the exposure of the image by the predicted exposure correction to produce an exposure-corrected image;
  wherein the average histogram, the histogram of the active region of interest, and the histogram of the active image each represent a count of image sectors as a function of luminance of the image sectors.

6. The method of claim 5, wherein said generating an average histogram as a weighted average of a histogram of the active region of interest and a histogram of the active image comprises:
  calculating a likelihood that the active region of interest influences the desired exposure shift of the image; and
  generating the average histogram as a average of the histogram of the active region of interest and a histogram of the active image, weighted by the likelihood.

7. The method of claim 6, wherein said calculating a likelihood that the active region of interest influences the desired exposure shift of the image comprises calculating the likelihood using the formula:

$$p(ROI) = \frac{1}{1 + \exp(-s(|\log_2 r_{ROI}| - o))}$$

wherein o represents the luminance difference in stops between the active region of interest and that portion of the image not including the active region of interest when the likelihood is equal to 0.5, wherein s is proportional to the slope of the formula at $|\log_2 r_{ROI}|=O$, and wherein $r_{ROI}$ is the ratio of the average linear luminance in the active region of interest to the average linear luminance of that portion of the image not including the active region of interest.

8. The method of claim 5, wherein said extracting values of features from the average histogram comprises extracting values of linear features from the average histogram.

9. The method of claim 8, wherein said extracting values of features from the average histogram comprises extracting at least one moment from the average histogram.

10. The method of claim 5, wherein said extracting values of features from the average histogram comprises extracting values of nonlinear features from the average histogram.

11. The method of claim 10, wherein said extracting values of features from the average histogram comprises extracting at least one percentile from the average histogram.

12. The method of claim 5, wherein the image sectors each consist of a single pixel.

13. The method of claim 5, wherein the image sectors each consist of a plurality of pixels.

14. An apparatus for processing an image, the apparatus comprising:
  means for determining an absolute logarithm of an average luminance ratio for each region of a plurality of predetermined regions within the image, wherein the average luminance ratio of a region comprises a ratio of the average luminance of the region to an average luminance of the image excluding the region;
  means for identifying the region, from among the plurality of predetermined regions, with the highest absolute logarithm of the average luminance ratio of the region, the region with the highest absolute logarithm of the average luminance ratio being an active region of interest;
  means for extracting, from the image, values of at least one feature derived from the active region of interest in the image;
  means for predicting a desired exposure correction of the image based on the extracted feature values; and
  means for correcting the exposure of the image by the predicted exposure correction to produce an exposure-corrected image;
  wherein the active region of interest has a base size that is proportional to the dimensions of the image, wherein the dimensions of the active region of interest are proportional to the base size multiplied by a measure of average activity in the image, and wherein the average activity is based, at least in part, on luminance within the image.

15. An apparatus for processing an image, the apparatus comprising:
  means for determining an absolute logarithm of an average luminance ratio for each region of a plurality of predetermined regions within the image, wherein the average luminance ratio of a region comprises a ratio of the average luminance of the region to an average luminance of the image excluding the region;

means for identifying the region, from among the plurality of predetermined regions, with the highest absolute logarithm of the average luminance ratio of the region, the region with the highest absolute logarithm of the average luminance ratio being an active region of interest;

means for extracting, from the image, values of at least one feature derived from the active region of interest in the image;

means for predicting a desired exposure correction of the image based on the extracted feature values; and means for correcting the exposure of the image by the predicted exposure correction to produce an exposure-corrected image;

wherein the means for extracting comprises:
means for identifying the active region of interest in the image;
means for screening the image for activity to generate an active image;
means for generating an average histogram as a weighted average of a histogram of the active region of interest and a histogram of the active image; and
means for extracting values of features from the average histogram;
wherein the average histogram, the histogram of the active region of interest, and the histogram of the active image each represent a count of image sectors as a function of luminance of the image sectors.

16. The apparatus of claim 15, wherein the means for generating comprises:
means for calculating a likelihood that the active region of interest influences the desired exposure shift of the image; and
means for generating the average histogram as a average of the histogram of the active region of interest and a histogram of the active, weighted by the likelihood.

17. The apparatus of claim 16, wherein the means for calculating comprises means for calculating the likelihood using the formula:

$$p(ROI) = \frac{1}{1 + \exp(-s(|\log_2 r_{ROI}| - o))}$$

wherein o represents the luminance difference in stops between the active region of interest and that portion of the image not including the active region of interest when the likelihood is equal to 0.5, wherein s is proportional to the slope of the formula at $|\log_2 r_{ROI}|=o$, and wherein $r_{ROI}$ is the ratio of the average linear luminance in the active region of interest to the average linear luminance of that portion of the image not including the active region of interest.

18. The apparatus of claim 15, wherein the means for generating the average histogram comprises means for extracting values of linear features from the average histogram.

19. The apparatus of claim 18, wherein the means for generating the average histogram comprises means for extracting at least one moment from the average histogram.

20. The apparatus of claim 15, wherein the means for generating the average histogram comprises means for extracting values of nonlinear features from the average histogram.

21. The apparatus of claim 20, wherein the means for generating the average histogram comprises means for extracting at least one percentile from the average histogram.

22. The apparatus of claim 15, wherein the image sectors each consist of a single pixel.

23. The apparatus of claim 15, wherein the image sectors each consist of a plurality of pixels.

24. A computer-readable storage medium comprising instructions for processing an image, the instructions comprising:
instructions for determining an absolute logarithm of an average luminance ratio for each region of a plurality of predetermined regions within the image, wherein the average luminance ratio of a region comprises a ratio of the average luminance of the region to an average luminance of the image excluding the region;
instructions for identifying the region, from among the plurality of predetermined regions, with the highest absolute logarithm of the average luminance ratio of the region, the region with the highest absolute logarithm of the average luminance ratio being an active region of interest;
instructions for extracting, from the image, values of at least one feature derived from the active region of interest in the image;
instructions for predicting a desired exposure correction of the image based on the extracted feature values; and
instructions for correcting the exposure of the image by the predicted exposure correction to produce an exposure-corrected image;
wherein the active region of interest has a base size that is proportional to the dimensions of the image, wherein the dimensions of the active region of interest are proportional to the base size multiplied by a measure of average activity in the image, and wherein the average activity is based, at least in part, on luminance within the image.

25. A computer-readable storage medium comprising instructions for processing an image, the instructions comprising:
instructions for extracting, from the image, values of at least one feature derived from an active region of interest in the image, and wherein the feature extractor is further configured to:
instructions for identifying the active region of interest in the image,
instructions for screening the image for activity to generate an active image,
instructions for generating an average histogram as a weighted average of a histogram of the active region of interest and a histogram of the active image, and
instructions for extracting values of features from the average histogram;
instructions for predicting a desired exposure correction of the image based on the extracted feature values; and
instructions for correcting the exposure of the image by the predicted exposure correction to produce an exposure-corrected image;
wherein the average histogram, the histogram of the active region of interest, and the histogram of the active image each represent a count of image sectors as a function of luminance of the image sectors.

26. The computer-readable storage medium of claim 25, wherein the image sectors each consist of a single pixel.

27. The computer-readable storage medium of claim 25, wherein the image sectors each consist of a plurality of pixels.

* * * * *